(12) United States Patent
Ishida et al.

(10) Patent No.: US 9,371,467 B2
(45) Date of Patent: Jun. 21, 2016

(54) FORMING MATERIAL, PAINT MATERIAL COMPOSITION AND PRODUCTION METHOD FOR FORMING MATERIAL

(75) Inventors: Yasuyuki Ishida, Otsu (JP); Tadahiko Iwaya, Otsu (JP); Takashi Mimura, Otsu (JP); Yasushi Takada, Otsu (JP)

(73) Assignee: Toray Industries, Inc. (JP)

( * ) Notice: Subject to any disclaimer, the term of this patent is extended or adjusted under 35 U.S.C. 154(b) by 88 days.

(21) Appl. No.: 14/131,537

(22) PCT Filed: Jun. 29, 2012

(86) PCT No.: PCT/JP2012/066652
§ 371 (c)(1),
(2), (4) Date: Jan. 8, 2014

(87) PCT Pub. No.: WO2013/008645
PCT Pub. Date: Jan. 17, 2013

(65) Prior Publication Data
US 2014/0148547 A1    May 29, 2014

(30) Foreign Application Priority Data

Jul. 11, 2011  (JP) ................. 2011-152474
Jan. 13, 2012  (JP) ................. 2012-004768
Jun. 7, 2012   (JP) ................. 2012-129576

(51) Int. Cl.
| | | |
|---|---|---|
| *B05D 1/28* | (2006.01) | |
| *B05D 1/18* | (2006.01) | |
| *C09D 133/16* | (2006.01) | |
| *C09D 201/00* | (2006.01) | |
| *C09D 5/16* | (2006.01) | |
| *C09D 7/12* | (2006.01) | |
| *G02B 1/10* | (2015.01) | |
| *B05D 1/30* | (2006.01) | |
| *B05D 3/02* | (2006.01) | |

(52) U.S. Cl.
CPC .............. *C09D 133/16* (2013.01); *B05D 1/18* (2013.01); *B05D 1/28* (2013.01); *B05D 1/30* (2013.01); *B05D 3/0254* (2013.01); *C09D 5/1625* (2013.01); *C09D 7/125* (2013.01); *C09D 7/1266* (2013.01); *C09D 7/1275* (2013.01); *C09D 201/00* (2013.01); *G02B 1/105* (2013.01)

(58) Field of Classification Search
USPC ........................................ 524/544; 427/385.5
See application file for complete search history.

(56) References Cited

U.S. PATENT DOCUMENTS

| | | | | |
|---|---|---|---|---|
| 2,681,294 A | * | 6/1954 | Beguin ............... | B29C 47/8845 118/300 |
| 2005/0008863 A1 | * | 1/2005 | Mimura ................ | G02B 1/11 428/409 |
| 2009/0086326 A1 | * | 4/2009 | Hamamoto ......... | G02F 1/133502 359/601 |

FOREIGN PATENT DOCUMENTS

| | | | |
|---|---|---|---|
| JP | 10-310455 | * | 11/1998 |
| JP | 10-310455 A | | 11/1998 |
| JP | 2001-272510 A | * | 10/2001 |
| JP | 2002-103357 A | | 4/2002 |
| JP | 2004-005005 A | | 1/2004 |
| JP | 2004-110781 A | | 4/2004 |
| JP | 2005-227407 A | | 8/2005 |
| JP | 2006-328367 A | * | 12/2006 |
| JP | 2008-238646 A | | 10/2008 |
| JP | 2009-047915 A | | 3/2009 |
| JP | 2009-122416 A | | 6/2009 |
| JP | 2010-100804 A | | 5/2010 |
| JP | 2010-209045 A | | 9/2010 |
| JP | 2010-217699 A | * | 9/2010 |
| JP | 2010-259971 A | | 11/2010 |

OTHER PUBLICATIONS

Craig Hawker et al., "A new convergent approach to monodisperse dendritic macromolecules," Journal of the Chemical Society, Chemical Communication, 1990, Issue 15, pp. 1010-1013 (Abstract only).
D.A. Tomalia et al., "Starburst Dendrimers: Molecular-Level Control of Size, Shape, Surface Chemistry, Topology, and Flexibility from Atoms to Macroscopic Matter," Angewandte Chemie International Edition in English, Feb. 1990, vol. 29, Issue 2, pp. 138-175 (Abstract only).
Jean M.J. Frechet, "Functional Polymers and Dendrimers: Reactivity, Molecular Architecture, and Interfacial Energy," Science, Mar. 1994, vol. 263, Issue 5154, pp. 1710-1715 (Abstract only).
Kakimoto Masaaki, Kagaku, 1995, vol. 50, pp. 608-612 and one sheet of English translation of the Abstract.

* cited by examiner

*Primary Examiner* — Peter D Mulcahy
*Assistant Examiner* — Henry Hu
(74) *Attorney, Agent, or Firm* — DLA Piper LLP (US)

(57) ABSTRACT

A forming material having a layer on at least one of surfaces of a support substrate material, wherein the layer contains a fluorine-containing compound, and has a 60-degree specular gloss level prescribed in JIS Z8741 (1997 edition) greater than or equal to 60%, and the layer has a surface property with a number of peaks exceeding a root-mean-square roughness (Rq) observed under an atomic force microscope (AFM) greater than or equal to 500 and less than or equal to 1500 per 25 µm².

3 Claims, No Drawings

FORMING MATERIAL, PAINT MATERIAL COMPOSITION AND PRODUCTION METHOD FOR FORMING MATERIAL

TECHNICAL FIELD

This disclosure relates to a forming material excellent in anti-fingerprint property, a paint composition capable of forming a layer excellent in anti-fingerprint property, and a production method for the forming material.

BACKGROUND

There is a problem that if a fingerprint (the fingerprint refers to a pattern made by lines of raised opening portions of perspiratory glands (ridge lines) present in the skin of finger tips, and to a trace of deposition of the pattern on a surface of an object) is deposited by a human finger touching a surface of an object, the fingerprint is recognized and the appearance gives an unpleasant impression of being seemingly dirty. An example of this is an incident where when the casing of a cellular phone is grabbed, fingerprints are deposited, the fingerprints are conspicuous, impairing the impression of cleanliness. Particularly recently, electronic appliances operated by fingers are increasing in number, for example, smart phones and touch panels, keyboards, remote controllers of televisions and air-conditioners and the like.

Furthermore, there is a problem that if a fingerprint deposits on an image display portion of an image display appliance, a signal display portion such as a warning light or the like, a surface of a lens, a mirror or the like, the visibility deteriorates due to unclear appearance of a displayed image, a displayed signal or a reflected image, difference in reflection rate between a site where a fingerprint is deposited and a site where a finger print is not deposited and the like. Examples are the liquid crystal screens of smart phones, televisions, car navigations and personal computers, signal display lights for guiding, warning and escape guidance, the lenses of glasses, sunglasses, telescopes and cameras, the transparent covers of the dials of clocks and watches, the rearview mirrors and inner rearview mirrors of vehicles and the like. Once a fingerprint deposits on these appliances, the fingerprint degrades the visibility of an object.

Furthermore, in recent years, various kinds of displays of smart phones, televisions, personal computer monitors or the like employ an antireflection member (antireflection film) whose surface has gloss to make images look high in contrast. However, such a material having glossiness makes it easy for a fingerprint to be visually recognized, which is an issue.

For such a problem, Japanese Patent Application Publication No. 2009-122416 proposes as a member that makes it hard for a fingerprint to be visually recognized (hereinafter, the property that a fingerprint on an article's surface is hard to be conspicuous, hard to be visually recognized, or hard to be seen will be termed the anti-fingerprint property) an "optical thin membrane film in which on one of surfaces of a substrate material there is formed a thin membrane layer that at least includes a low-refractive layer whose refractive index at a light wavelength of 550 nm is less than 1.75 or a high-refractive layer whose refractive index at the light wavelength of 550 nm is greater than or equal to 1.75, or both the layers, the optical thin membrane film being characterized in that when an oleic acid whose dry membrane thickness is 20 μm is applied onto a surface of the thin membrane layer, a CIELAB (conforming to JIS Z8729) color difference $\Delta E^*_{ab}$ ($=\{(\Delta L^*)^2+(\Delta a^*)^2+(\Delta b^*)^2\}^{1/2}$) with a D65 light source, a 5° incidence, a 2° view, and regular reflected light between the optical thin membrane film to which the oleic acid has been applied and the optical thin membrane film to which the oleic acid has not been applied is less than or equal to 5."

Furthermore, as a method of making it hard for a finger print to be visually recognized, Japanese Patent Application Publication No. 10-310455 proposes an "article made of a glass substrate which is characterized in that at least a portion of a surface of the glass substrate has a silica foundation layer and b a water-repellent and oil-repellent coating characterized by having been treated with perfluoroalkyl alkylsilane," and Japanese Patent Application Publication No. 2010-100804 proposes an "active energy ray hardening composition containing: an active energy ray hardening compound (A) having a fatty acid ester structure made up of a fatty acid whose carbon number is greater than or equal to 6, a polyalkylene oxide chain and a acryloyl group or a methacryloyl group; and an active energy ray hardening compound (B) different from the active energy ray hardening compound (A)."

Still further, as a technology that focuses on the configuration of a surface to make it harder for a fingerprint to be visually recognized, Japanese Patent Application Publication No. 2004-5005 proposes a "substrate plate for a touch panel in which a surface configuration of the rough-surfaced layer is 100 to 300 nm in center line average roughness (Ra), and is greater than or equal to 50 μm in average interval between bumps and dips," and Japanese Patent Application Publication No. 2010-259971 proposes a "composite in which a substrate plate is provided, and an anti-fingerprint deposition coating cover that contains a silicon compound and a hydrophilic metal oxide fine particle whose average particle diameter is 1 to 100 nm is formed on a surface of the substrate plate, the substrate plate being characterized in that glossiness of the coating cover is less than or equal to 8 and the color difference of the coating cover is less than 4.6."

The fingerprint is what is formed on an object such as a surface of a forming material as a liquid deposited on a human finger is transferred to a surface of the object such as the surface of the forming material when the human finger touches the object. The liquid that constitutes the fingerprint is in the state of a so-called dispersion in which water, organic salts (uric acid salts or the like), sebum (oleic acid, triolein or the like), and also dust present in the human living environment and particles contained in cosmetics (titanium oxide, zinc oxide, silica or the like) are mixed.

On the other hand, JP '416 discloses that, as a mock material for a fingerprint, oleic acid is applied to a surface of an optical thin membrane film, and a color difference calculated from the regular reflected light spectra of simple incident light from the paint-applied portion and a non-paint-applied portion is made less than or equal to specific value.

Therefore, in JP '416, in terms of the fingerprint deposition characteristic, since the fluidity of the liquid that constitutes a fingerprint greatly differs depending on the presence of particles, the mocking of the amount of deposition and the configuration of deposition is insufficient. Furthermore, in terms of evaluation of the color difference between the paint-applied portions/non-paint-applied portions, the effect of light scattering due to the presence of particles cannot be evaluated, and furthermore, the simple incident light is evaluated only from the regular reflected light. Therefore, a state in which a human actually perceives visual sensation cannot be reproduced. In consequence, it can be considered that in JP '416, the effect of making a fingerprint less conspicuous is insufficient.

There is thus a need to provide a forming material that has an anti-fingerprint property while maintaining glossiness or transparency and a scratch resistance that is needed for practical use, a paint composition capable of forming a layer that has an anti-fingerprint property, and a production method for the aforementioned layer. In connection with the foregoing task, the known technologies are in the following situation.

First, with regard to the visibility of a fingerprint, JP '416 proposes an optical thin membrane film that causes the color difference between before and after oleic acid is applied to be less than or equal to a certain value. However, according to our checking the visibility of a fingerprint under various conditions, it has been found that, with the property according to JP '416 alone, the effect of causing a fingerprint to be less conspicuous is insufficient.

Furthermore, the method of JP '455 provides a substrate surface with an undercoat layer, and a water-repellent and oil-repellent cover is provided on the layer, and the method of JP '804 causes the boundary line of a fingerprint with a surrounding hardening paint membrane to be less conspicuous by approximating the refractive index of the hardening paint membrane to the refractive index of components of the fingerprint and making the height of the deposited fingerprint as low as possible. However, according to our checking the visibility of a fingerprint under various conditions, the former shows considerable decline in glossiness, and the latter is insufficient in the foregoing effect with fingerprints rich in sebum, that is, neither of them can solve the task.

Still further, JP '005 and JP '971, while certainly being able to reducing the visibility of fingerprints, cannot provide a demanded glossiness, and, with the configuration of the surface being a rough surface, have not reached an idea regarding our technique.

SUMMARY

We thus provide:
1) A forming material having a layer on at least one of surfaces of a support substrate material, wherein
    the layer contains a fluorine-containing compound, and has a 60-degree specular gloss level prescribed in JIS Z8741 (1997 edition) which is greater than or equal to 60%, and the layer has a surface property that number of peaks exceeding a root-mean-square roughness (Rq) observed under an atomic force microscope (AFM) is greater than or equal to 500 and less than or equal to 1500 per 25 µm$^2$.
2) A forming material having a layer on at least one of surfaces of a support substrate material, wherein
    the layer has a 60-degree specular gloss level prescribed in JIS Z8741 (1997 edition) which is greater than or equal to 60%, and has a surface property that $\Delta E^*_{ab}$ (di: 8°)Sb10W10 and $\Delta E^*_{ab}$(de: 8°)Sb10W10 prescribed in JIS Z8730 (2009 edition) and JIS Z8722 (2009 edition) before and after a mock fingerprint mentioned below is deposited are less than or equal to 0.4 and less than or equal to 4.
    Mock fingerprint: what is obtained when a dispersion made up of 70 mass % of oleic acid and 30 mass % of silica whose number average particle diameter is 2 µm is deposited to 1.0 g/m$^2$ on a silicone rubber whose Ra according to JIS B0601 (2001 edition) is 3 µm and whose rubber hardness according to JIS K6253 (1997 edition) is 50, and this is deposited on an object surface at 30 KPa.
3) The forming material of 2) wherein amount of deposition of the mock fingerprint onto the layer surface is less than or equal to 0.1 g/m$^2$.
4) The forming material of 2) or 3) wherein a median diameter of oil droplets that constitute the mock fingerprint on the layer surface which is calculated based on an area reference frequency distribution is less than or equal to 80 µm.
5) The forming material of any one of 2) to 4) wherein number of peaks exceeding a root-mean-square roughness of the layer observed under an atomic force microscope (AFM) is greater than or equal to 500 and less than or equal to 1500 per 25 µm$^2$.
6) The forming material of any one of 1) to 5) wherein main components of the layer include: a fluorine compound A that is a compound having a reactive site and a site that includes at least one species selected from the set constituting of a fluoroalkyl group, a fluorooxy alkyl group, a fluoroalkenyl group, a fluoroalkanediyl group and a fluorooxy alkanediyl group; a binder component; and a particle whose number average particle diameter is greater than or equal to 5 nm and less than or equal to 250 nm.
7) The forming material of 6) wherein, provided that in a Hansen's solubility parameter of the fluorine compound A, a dispersion term is $\sigma_d$, a polarity term is $\sigma_p$ and a hydrogen bond term is $\sigma_h$, and that in the Hansen solubility parameter of the binder component, the dispersion term is $\sigma_{Bd}$, the polarity term is $\sigma_{Bp}$ and the hydrogen bond term is $\sigma_{Bh}$, conditions (1) and (2) are satisfied:
Condition 1: a parameter R defined by $$R=[(\sigma_d-\sigma_{Bd})^2+(\sigma_p-\sigma_{Bp})^2+(\sigma_h-\sigma_{Bh})^2]^{1/2}$$

has a value that is greater than or equal to 3 (MPa)$^{1/2}$ and less than or equal to 12 (MPa)$^{1/2}$
Condition 2:

$$\sigma_d<\sigma_{Bd}.$$

8) The forming material of 6) or 7) wherein the particle is in a moniliform connected and/or branched silica.
9) The forming material of any one of 6) and 8) wherein the fluorine compound A is a fluorine-containing dendrimer.
10) The forming material of any one of 6) to 8) wherein the fluorine compound A is a compound having a fluoropolyether site.
11) A paint composition that includes: a fluorine compound A that is a compound having a reactive site and a site that includes at least one species selected from the set consisting of a fluoroalkyl group, a fluorooxy alkyl group, a fluoroalkenyl group, a fluoroalkanediyl group and a fluorooxy alkanediyl group; a binder raw material; and a particle whose number average particle diameter is greater than or equal to 5 nm and less than or equal to 250 nm.
12) The paint composition of 11) wherein, provided that in a Hansen's solubility parameter of the fluorine compound A, a dispersion term is $\sigma_d$, a polarity term is $\sigma_p$ and a hydrogen bond term is $\sigma_h$, and that in the Hansen solubility parameter of the binder component, the dispersion term is $\sigma_{Bd}$, the polarity term is $\sigma_{Bp}$ and the hydrogen bond term is $\sigma_{Bh}$, conditions (1) and (2) are satisfied:
Condition 1: a parameter R defined by $$R=[(\sigma_d-\sigma_{Bd})^2+(\sigma_p-\sigma_{Bp})^2+(\sigma_h-\sigma_{Bh})^2]^{1/2}$$

has a value that is greater than or equal to 3 (MPa)$^{1/2}$ and less than or equal to 12 (MPa)$^{1/2}$
Condition 2:

$$\sigma_d<\sigma_{Bd}.$$

13) The paint composition of 11) or 12) wherein the particle is in a moniliform connected and/or branched silica.
14) The paint composition of any one of 11) to 13) wherein the fluorine compound A is a fluorine-containing dendrimer.
15) The paint composition of any one of 11) to 13) wherein the fluorine compound A has a fluoropolyether structure.
16) A production method for a forming material in which a layer is formed on at least one of surfaces of a support substrate material, through a painting step of painting the paint composition of any one of 11) to 15), and a drying step.
17) The production method for the forming material of 16) wherein a heating system in the drying step includes a radiant heat transfer system.

A forming material that makes a fingerprint hard to be visually recognized while maintaining glossiness or transparency and a scratch resistance that is needed for practical use, a paint composition capable of forming a layer that develops the aforementioned effect, and a production method for the aforementioned layer can be provided.

DETAILED DESCRIPTION

We have found that a forming material's containing a fluorine-containing compound, having glossiness and having on at least one of surfaces, a layer that has a micro-asperities structure of a specific height in a certain amount per unit area is effective for the aforementioned task. We believe that because of having a micro-asperities structure made up of a material that contains a fluorine-containing compound, the forming material is hard for components of a fingerprint to deposit on, and if components of a fingerprint deposit on the forming material, the oil droplets formed by deposited components are made smaller, and therefore that light scattering and absorption is reduced, and both glossiness and less easy visual recognition of a fingerprint are achieved.

Furthermore, we achieved both glossiness and the fingerprint visibility reducing effect by depositing a mock fingerprint similar in composition to a real fingerprint as mentioned above, onto a forming material with glossiness, measuring reflected colors before and after the deposition by two methods: one in which regular reflected light is included, and one in which regular reflected light is moved, and then making the obtained color differences less than or equal to a specific value. This is because we found that a fingerprint is hard to be visually recognized if both the color differences are less than a certain value, by focusing attention on the fact that the human eye recognizes a fingerprint by change in glossiness and change in color hue, and evaluating change in glossiness by the color difference with regular reflected light included since change in glossiness is detected by regular reflected light, and evaluating change in color hue by the color difference with regular reflected light removed since change in color hue is detected by diffused reflected light.

Furthermore, we found that to achieve both glossiness and the fingerprint visibility reducing effect, it is preferable that the forming material have a layer that causes the amount of deposition of the mock fingerprint to be less than or equal to a certain value. This is because we found that making the amount of deposition less than or equal to a certain value is effective to lessen the change in the color hue, in particular, regarding the visibility of a fingerprint.

Still further, we found that, as for the surface of the forming material that exhibits a property as mentioned above (color difference between before and after deposit, the amount of deposit), it is effective to provide a micro-asperities structure of a specific height in a certain amount per unit area. Although the reason for this is not clear, we believe that introduction of the micro-asperities reduces the size of oil droplets formed by components of a deposited fingerprint, and therefore reduces light scattering and absorption so that the fingerprint becomes hard to be visually recognized. Note herein that the oil droplet refers to a microscopic aggregate of liquid and solid constituting a fingerprint and a mock fingerprint deposited on a forming material surface.

Furthermore, we found that, as for the forming material that exhibits a property as mentioned above (the color difference between before and after deposit, the amount of deposit), a preferable condition exists between the solubility of a component constituting the layer that makes the amount of deposition of the mock fingerprint less than or equal to a certain value and the solubility of a component constituting a layer that forms the substrate material. If the solubilities of the two components are greatly different from each other, the components do not mix with each other and it becomes difficult to maintain a quality grade, a transparency or a glossiness. On the other hand, in the case where the solubilities are similar to each other, it is considered that the two components thoroughly mix with each other and it becomes difficult to form the layer that makes the amount of deposition of the mock fingerprint less than or equal to a certain value.

Still further, we found that introduction of the asperities structure as mentioned above can mitigate the degradation of quality grade attributed to the above-described solubilities. Although the reason is not clear, it is estimated that a particle component constituting the asperities structure assists construction of a homogeneous layer.

Hereinafter, examples of our materials, compositions and methods will be concretely described.

It is important the forming material has a layer at least one of surfaces, and that the layer includes a fluorine-containing compound, and the layer have a specific specular gloss level, and a surface property of having micro-asperities.

The fluorine-containing compound indicated herein refers to a group of compounds that include in their structures a great number of $CF_3$— or $CF_2$—, which provides low surface free energy, or that make it easy for $CF_3$— or $CF_2$— to align n a surface, and use of a fluorine compound A mentioned later is preferable from the viewpoint of easy fixation of the fluorine compound to a surface, easy uneven distribution, and high quality grade.

The specular gloss level indicated herein a value of 60-degree specular gloss level provided by measurement in conformity to JIS Z8741 (1997 edition), and is preferred to be greater than or equal to 60%, more preferred to be greater than or equal to 70%, and particularly preferred to be greater than or equal to 75%. If the specular gloss level is less than 60%, it is felt that glossiness is insufficient.

Note herein that, as for the surface property of having micro-asperities, the number of peaks exceeding a root-mean-square roughness (Rq) observed under an atomic force microscope (AFM) is preferred to be greater than or equal to 500 and less than or equal to 1500 per 25 $\mu m^2$, and more preferred to be greater than or equal to 800 and less than or equal to 1200 per 25 $\mu m^2$. If the number of peaks is outside such a range, there can be a case where the effect of reducing the size of oil droplets that constitute a fingerprint mentioned above is insufficient.

It is important that the forming material have a layer on at least one of surfaces, and that the layer has a specific specular gloss level, and that the color difference with regular reflected light included and the color difference with regular reflected light removed between before and after deposition of a mock fingerprint be within specific ranges.

The specular gloss level indicated herein is a value of 60-degree specular gloss level provided by measurement in conformity to JIS Z8741 (1997 edition) is preferred to be greater than or equal to 60%, more preferred to be greater than or equal to 70%, and particularly preferred to be greater than or equal to 75%. If the specular gloss level is less than 60%, it is felt that glossiness is insufficient.

The color difference ($\Delta E^*_{ab}$(di: 8°)Sb10W10) with regular reflected light included between before and after deposition of a mock fingerprint is preferred to be less than or equal to 0.4, more preferred to be less than or equal to 0.2, and particularly preferred to be less than or equal to 0.1. Furthermore, the color difference ($\Delta E^*_{ab}$(de: 8°)Sb10W10) with regular reflected light removed between before and after deposition of a mock fingerprint is preferred to be less than or equal to 4, more preferred to be less than or equal to 3, and particularly preferred to be less than or equal to 2. If the color difference with regular reflected light included between before and after deposition of a mock fingerprint or the color difference with regular reflected light removed between before and after deposition of a mock fingerprint exceeds 0.4 or 4, respectively, the fingerprint deposition trace will be clearly recognized visually.

Note herein that the mock fingerprint refers to what is obtained when using a transfer member created by roughing a surface of a silicon rubber whose rubber hardness according to JIS K6253 (1997 edition) is 50 to Ra 3 μm according to JIS B0601 (2001 edition), a dispersion made up of 70 mass % of oleic acid and 30 mass % of silica whose number average particle diameter is 2 μm is deposited to 1.0 g/m$^2$ on an object surface at 30 KPa. Incidentally, changes of ±1 μm in Ra are permissible, and as for the amount of deposition of the dispersion made up of 70 mass % of oleic acid and 30 mass % of silica whose number average particle diameter is 2 μm, changes of ±0.1 g/m$^2$ are permissible. A concrete procedure of mock fingerprint transfer will be described later.

Next, the amount of deposition of the mock fingerprint in the forming material is preferred to be less than or equal to a certain value. Concretely, the amount of deposition in the case where the deposition is made on an object surface of the forming material is preferred to be less than or equal to 0.1 g/m$^2$, more preferred to be less than or equal to 0.05 g/m$^2$, and particularly preferred to be less than or equal to 0.01 g/m$^2$.

Details of a measurement method for the amount of deposition of a mock fingerprint will be described later. However, the amount of deposition is a value found by measuring the amount of silica contained in the mock fingerprint via a wavelength-dispersive fluorescent X-ray device. If the amount of deposition of a mock fingerprint exceeds 0.1 g/m$^2$, there can be a case where, regarding the visibility of a fingerprint, the change in color hue, in particular, is large.

Next, with regard to the configuration of the oil droplets that constitute the mock fingerprint on the forming material, the diameter of the oil droplets is preferred to be small. Since, in the forming material, the visibility of a fingerprint increases as the area that the oil droplet deposition portions of the surface occupy increases, the configurations of the oil droplets can be evaluated by an area reference frequency distribution obtained by weighting the frequency distribution of oil droplet diameters according to that area through the use of a projection image of the oil droplets in a forming material surface direction. In the area reference frequency distribution, the diameter whose cumulative frequency is N % of the total is expressed as $D_N$. Of the diameters, the diameter with N equal to 50 is particularly termed the median diameter. The median diameter $D_{50}$ calculated from the area reference frequency distribution is preferred to be less than or equal to 80 μm, more preferred to be less than or equal to 70 μm, and particularly preferred to be less than or equal to 50 μm. If the median diameter D50 exceeds such a value, the fingerprint is more likely to be visually recognized due to the scatter of light by the oil droplets.

Next, the forming material is preferred to have a layer whose surface has micro-asperities; in particular, there is a preferred range for the number of asperities in a specific range that are present per unit area. Concretely, the number of peaks exceeding a root-mean-square roughness (Rq) observed under an atomic force microscope (AFM) is preferred to be greater than or equal to 500 and less than or equal to 1550 per 25 μm$^2$, and more preferred to be greater than or equal to 800 and less than or equal to 1200 per 25 μm$^2$. If the number of such peaks is outside such a range, there can be a case where the effect of reducing the size of the oil droplets that constituted a fingerprint mentioned above becomes insufficient.

Note herein that the root-mean-square roughness (Rq) refers to a square root of a value obtained by averaging the squares of deviations from an average line to measurement curves, which is found from a roughness curve, and that the peaks refer to those where the distance to a measurement curve from an average line as a reference exceeds the root-mean-square roughness. Incidentally, generally, an arithmetic mean roughness (Ra) under an atomic force microscope based on JIS R1683 (2007 edition) or the like is used as an index of the surface configuration. However, Ra is a numerical value that represents average depth information regarding the entire surface area, and cannot make it possible to evaluate the number or the local configuration regarding such asperities structure as our forming material has.

Next, the forming material is preferred to have a layer whose main component includes a fluorine compound A described later (as a fluorine-containing compound), a binder component and a particle. The "main component" refers to a components that occupies 50 mass % or more of the entire components, unless otherwise specified. In this case, it is indicated that the sum of the fluorine compound A, the binder component and the particle is greater than or equal to 50 mass %. Although details of the fluorine compound A, the binder component and the particle will be described later, the fluorine compound A increases the contact angle of the liquid that constitutes a fingerprint and therefore reduces the amount of deposition by reducing the surface energy, and the binder component has a function of binding the particles and providing an anti-scratch property that is needed for practical use. The particle is used to form the above-described micro-asperities structure, and it is preferred that the number average particle diameter of primary particles be less than or equal to 250 nm. If the number average particle diameter of the primary particle exceeds 250 nm, there can be a case where a necessary glossiness is not obtained. Details of the measurement method for the number average particle diameter will be described later, and preferred proportions of the fluorine compound A, the binder component and the particle will also be described later.

A preferable condition exists between the solubilities of the above-described fluorine compound A and the above-described binder component. Concretely, a condition can be expressed by using the Hansen's solubility parameter in which the Hildebrand's solubility parameter is divided into three components: the dispersion term $\sigma_d$, the polarity term $\sigma_p$, and the hydrogen bond term $\sigma_h$. The dispersion term $\sigma_d$ shows the effect caused by nonpolar interaction, and the polarity term $\sigma_p$ shows the effect caused by dipole-dipole force, and the hydrogen bond term $\sigma_h$ shows the effect caused by hydrogen bond force.

When in the Hansen's solubility parameter of the fluorine compound A, the dispersion term is $\sigma_d$, the polarity term is $\sigma_p$ and the hydrogen bond term is $\sigma_h$, and in the Hansen's solubility parameter of the binder component, the dispersion term is $\sigma_{Bp}$, the polarity term is $\sigma_{Bp}$ and the hydrogen bond term is $\sigma_{Bh}$, the parameter R defined by $R=[(\sigma_d-\sigma_{Bd})^2+(\sigma_p-\sigma_{Bp})^2+(\sigma_h-\sigma_{Bh})^2]^{1/2}$ is preferred to have a value greater than or equal to 3 $(MPa)^{1/2}$ and less than or equal to 12 $(MPa)^{1/2}$, more preferred to have a value greater than or equal to 3 $(MPa)^{1/2}$ and less than or equal to 8 $(MPa)^{1/2}$, and particularly preferred to have a value greater than or equal to 4 $(MPa)^{1/2}$ and less than or equal to 6 $(MPa)^{1/2}$. The parameter R corresponds to the distance between the coordinate point $(\sigma_d, \sigma_p, \sigma_h)$ of the fluorine compound A and the coordinate point $(\sigma_{Bd}, \sigma_{Bp}, \sigma_{Bh})$ of the binder component in three-dimensional coordinate axes whose axes represent the dispersion term, the polarity term and the hydrogen bond term of the Hansen's solubility parameter. Then, the greater this distance, the more difficult the mixture of the two becomes, and the smaller the distance, the more easily the two mix. Therefore, in the case where the parameter R exceeds 12 $(MPa)^{1/2}$, there can be a case where the fluorine compound A and the binder component do not sufficiently mix with each other so that transparency and/or glossiness declines. On the other hand, in the case where the parameter R is less than 3 $(MPa)^{1/2}$, there can be a case where the fluorine compound A and the binder component thoroughly mix with each other so that formation of the layer becomes difficult and the amount of fingerprint deposition increases.

Furthermore, with regard to the dispersion term $\sigma_d$ in the Hansen's solubility parameter of the fluorine compound A and the dispersion term $\sigma_{Bd}$ in the Hansen's solubility parameter of the binder component, it is desirable that the relation of $$\sigma_d < \sigma_{Bd}$$

be satisfied. The above-described fluorine compound A separating to the membrane surface and forming a layer is an effect caused by Van der Waals interaction, that is, is considered to derive from the dispersion term. Therefore, in the case where the foregoing condition is not satisfied, there can be a case where constructing a layer that causes the amount of deposition of the mock fingerprint to be less than or equal to a certain value on an outermost surface becomes difficult and therefore the amount of fingerprint deposition increases.

Incidentally, with regard to many solvents and some resins, the values of the Hansen's solubility parameter have been investigated, and those values are mentioned in, for example, "Polymer Handbook (fourth Edition)," edited by J. Brandrup, et al. (JOHN WILEY & SONS). On the other hand, with regard to the fluorine compound A and the binder component mentioned above whose solubility parameter values are not recorded in databases as mentioned above, the parameters can be calculated through the use of Hansen Solubility Parameter in Practice (HSPiP) ver. 3.1.03 (http://www.hansen-solubility.com/index.php?id), by determining the ease of dissolution in a solvent whose parameter value is known by a method shown in conjunction with Examples, given a nature that materials whose solubility parameter values are similar to each other easily dissolve in each other.

Next, there is a preferable configuration for the conglomerate of the above-described primary particle. Concretely, it is preferable that the primary particle exist in a moniliform connected and/or branched configuration. Although details of this particle will be described below, the use of silica as the particle leads to generally termed self-organization due to particle-particle interaction force resulting from the surface state of the particle and the lateral capillary force present between particles in the painting step-drying step when a layer is formed at least one of the surfaces of the support substrate material, so that the aforementioned preferred asperities structure is apt to be formed.

Still further, the fluorine compound A is preferred to be a compound that has a reactive site and a site that includes at least one species selected from the set consisting of fluoroalkyl groups, fluorooxy alkyl groups, fluoroalkenyl groups, fluoroalkanediyl groups and fluorooxy alkanediyl groups, and a more preferred such compound is a fluorine-containing dendrimer, and another more preferred such compound is a compound having a fluoropolyether site. Using these compounds, sites that exhibit low surface energy can be caused to exist at high density on the outermost surface. The fluorine-containing dendrimer and the compound having a fluoropolyether site will be described later.

Hereinafter, our materials, compositions and methods will be described in detail.

Forming Material, and Layer

The configuration of the forming material may be either a planar shape (a film, a sheet, a plate) or a three-dimensional configuration (formed body) as long as the formed article has on its surface a layer that satisfies the desired characteristics. Note herein that the "layer" refers to a layer that can be distinguished as having an interfacial boundary at which the element composition, the configuration of materials (particles and the like) contained or the physical property is discontinuous in comparison with the adjacent site, along the thickness direction from the surface of the forming material, and refers to a site that has a finite thickness. More concretely, the "layer" refers to a site which is distinguished by the discontinuous interfacial boundary when a section of the forming material is observed in the thickness direction from the surface by various composition/elementary analysis devices (IR, XPS, XFR, EDAX, SIMS and the like) or under an electron microscope (transmission type, scanning type) or an optical microscope, and which has a finite thickness.

The layer may have, in addition to the anti-fingerprint property, other functions such as antireflection, hard coating, antistatic, antifouling property, electroconductivity, heat ray reflection, near-infrared ray absorption, easy adhesion and the like.

The thickness of the layer is not particularly limited, but is preferred to be greater than or equal to 1 nm and less than or equal to 100 μm, and more preferred to be greater than or equal to 5 nm and less than or equal to 50 μm.

Paint Material Composition

The paint composition refers to a composition in a liquid form at normal temperature and capable of forming the "layer" on a forming material surface by a common painting process made up of a painting step, a drying step and a hardening step, and is preferred to contain a fluorine compound A and a binder raw material whose parameters R corresponding to the distance in three-dimensional coordinate axes whose axes represent the dispersion term, the polarity term and the hydrogen bond term in the Hansen's solubility parameter has a value greater than or equal to 3 $(MPa)^{1/2}$ and less than or equal to 12 $(MPa)^{1/2}$ and about which $\sigma_d < \sigma_{Bd}$ is satisfied, and a particle whose number average particle diameter is less than or equal to 250 nm and, furthermore, may also contain various additives such as a solvent, a photopolymerization initiator, a hardening agent, a catalyst or the like. Details of the fluorine compound A, the binder raw material and the particle will be described later.

Fluorine Compound A

The fluorine compound A referred to a compound that has a reactive site and a site that includes at least one species selected from the set consisting of fluoroalkyl groups, fluorooxy alkyl groups, fluoroalkenyl groups, fluoroalkanediyl groups and fluorooxy alkanediyl groups.

Note herein that the fluoroalkyl groups, the fluorooxy alkyl groups, the fluoroalkenyl groups, the fluoroalkanediyl groups and the fluorooxy alkanediyl groups are each a substituted group in which one or more of the hydrogens that an alkyl group, an oxyalkyl group, an alkenyl group, an alkanediyl group or an oxyalkanediyl group has are substituted with fluorines, and are each a substituted group composed mainly of fluorine atoms and carbon atoms, and a branch may exist in the structure, and a plurality of these sites may be connected to form a dimer, trimer, oligomer or polymer structure.

Furthermore, the reactive site refers to a site that reacts with another component, using external energy such as heat or light. As such a reactive site, there can be cited alkoxy silyl groups, silanol groups formed by hydrolysis of alkoxy silyl groups, carboxyl groups, hydroxyl groups, epoxy groups, vinyl groups, allyl groups, acryloyl groups, methacryloyl groups and the like. From the viewpoint of reactivity and handling ability, the alkoxy silyl groups, the silyl ether groups and silanol groups as well as epoxy groups and acryloyl (methacryloyl) groups are preferred, and the vinyl groups, the allyl groups, the acryloyl groups and the methacryloyl groups are more preferred, and the acryloyl groups and the methacryloyl groups are particularly preferred.

An example of the fluorine compound A is a compound represented by the following Formula (1):

$$R^{fl}—R^2—D^1 \quad (1)$$

$R^{fl}$ indicates a site that includes a fluoroalkyl group, a fluorooxy alkyl group, a fluoroalkenyl group, a fluoroalkanediyl group or a fluorooxy alkanediyl group, and $R^2$ indicates an alkanediyl group and an alkanetriyl group, an ester structure derived from either one of the groups, a urethane structure, an ether structure or a triazine structure, and $D^1$ indicates a reactive site.

As examples of Formula (1), there can be cited 2,2,2-trifluoroethyl acrylate, 2,2,3,3,3-pentafluoropropyl acrylate, 2-perfluorobutyl ethyl acrylate, 3-perfluorobutyl-2-hydroxy propyl acrylate, 2-perfluorohexyl ethyl acrylate, 3-perfluorohexyl-2-hydroxy propyl acrylate, 2-perfluorooctyl ethyl acrylate, 3-perfluorooctyl-2-hydroxy propyl acrylate, 2-perfluorodecyl ethyl acrylate, 2-perfluoro-3-methyl butyl ethyl acrylate, 3-perfluoro-3-methoxy butyl-2-hydroxy propyl acrylate, 2-perfluoro-5-methyl hexyl ethyl acrylate, 3-perfluoro-5-methyl hexyl-2-hydroxy propyl acrylate, 2-perfluoro-7-methyl octyl-2-hydroxy propyl acrylate, tetrafluoropropyl acrylate, octafluoropentyl acrylate, dodecafluoroheptyl acrylate, hexadecafluorononyl acrylate, hexafluorobutyl acrylate, 2,2,2-trifluoroethyl methacrylate, 2,2,3,3,3-pentafluoropropyl methacrylate, 2-perfluorobutyl ethyl methacrylate, 3-perfluorobutyl-2-hydroxy propyl methacrylate, 2-perfluorooctyl ethyl methacrylate, 3-perfluorooctyl-2-hydroxy propyl methacrylate, 2-perfluorodecyl ethyl methacrylate, 2-perfluoro-3-methyl butyl ethyl methacrylate, 3-perfluoro-3-methyl butyl-2-hydroxy propyl methacrylate, 2-perfluoro-5-methyl hexyl ethyl methacrylate, 3-perfluoro-5-methyl hexyl-2-hydroxy propyl methacrylate, 2-perfluoro-7-methyl octyl ethyl methacrylate, 3-perfluoro-7-methyl octyl ethyl methacrylate, tetrafluoropropyl methacrylate, octafluoropentyl methacrylate, octafluoropentyl methacrylate, dodecafluoroheptyl methacrylate, hexadecafluorononyl methacrylate, 1-trifluoromethyl trifluoroethyl methacrylate, hexafluorobutyl methacrylate, triacryloyl-heptaidecafluorononenyl-pentaerythritol and the like. The Hansen's solubility parameters of these fluorine compounds A are featured according to the property of the above-described reactive site.

Furthermore, as for the fluorine compound A, preferred compounds exist. One of the preferred compounds is a fluorine-containing dendrimer, and another one is a compound that has a fluoropolyether site.

Note herein that the fluorine-containing dendrimer refers to a dendrimer that contains a fluoroalkyl group, a group of fluorooxy alkyl or the like, a fluoroalkenyl group, a fluoroalkanediyl group, or a fluorooxy alkanediyl group. The dendrimer is a collective term for branched macromolecules having regular arborization which are described by, for example, Hawker, et al., J. Chem. Soc., Chem. Commun. 1990, (15), 1010-1013, D. A. Tomalia, et al., Angew. Chem. Int. Ed. Engl., 29, 138-175 (1990), J. M. J. Frechet, Science, 263, 1710 (1994), Kakimoto Masaaki, Kagaku, vol. 50, p. 608 (1995) and the like. Such molecules, because of having a macromolecular structure in which regular branches extend from a center of the molecule, assume spherical molecular form due to the extreme steric crowding of branch terminals that occurs with changes toward higher molecular weights, as explained by, for example, D. A. Tomalia, et al., Angew. Chem. Int. Ed. Engl., 29, 138-175 (1990).

The weight average molecular weight (hereinafter, abbreviated to Mw) is preferred to be 1000 to 200000 in terms of polystyrene by gel permeation chromatography (GPC), and more preferred to be 2000 to 100000, and most preferred to be 5000 to 60000.

This fluorine-containing dendrimer and the compound that has a fluoropolyether site, which are preferred to have a reactive site as described above, are more preferred to have a (meth)acryl group as a reactive site, from the viewpoint of ease of fixation to the surface.

Furthermore, the fluoropolyether site is a site made up of a fluoroalkyl group, an oxyfluoroalkyl group an oxyfluoroalkyldiyl group and the like, and is a structure represented by Formulas (2) and (3):

$$CF_{n1}H_{(3-n1)}—(CF_{n2}H_{(2-n2)})_kO—$$

$$—(CF_{n3}H_{(2-n3)})_mO— \quad (2)$$

$$—(CF_{n4}H_{(2-n4)})_pO—(CF_{n5}H_{(2-n5)})_sO— \quad (3)$$

where, n1 refers to an integer of 1 to 3, n2 to n5 refer to integers of 1 or 2, and k, m, p and s refer to an integer greater than or equal to 0. Preferably, n1 is an integer greater than or equal to 2, and n2 to n5 are an integers 1 or 2. More preferably, n1 is 3, and n2 and n4 are 2, and n3 and n5 are integers of 1 or 2.

The chain length of the fluoropolyether site has a preferred range, that is, the carbon number therefore is preferred to be greater than or equal to 4 and less than or equal to 12, more preferred to be greater than or equal to 4 and less than or equal to 10, and more preferred to be greater than or equal to 6 and the less than or equal to 8. If the carbon number is less than 4, there can be a case where the decline in surface energy is small. If the carbon number is greater than 12, there can be a case where the solubility thereof in a solvent declines.

Incidentally, the fluorine compound A may have a plurality of fluoropolyether sites per molecule.

As compounds commercially sold that can be used as the fluorine compound A, there can be cited, for example, FA-200 (Nissan Chemistry Industries, Ltd.) for the fluorine-containing dendrimer, and there can be cited, for example, RS-75 (DIC Corporation), Optool DSX, Optool DAC (DAIKIN INDUSTRIES, LTD), C10GACRY, C8HGOL (YUSHISEIHIN CO., Ltd) and the like for the compound having a fluoropolyether site whose carbon number is greater than or equal to 4 and less than or equal to 12, and these products can be utilized.

Binder Component, Binder Raw Material

The forming material is preferred to have a layer that contains a "binder component," and the paint composition is preferred to contain a "binder raw material."

Note herein that the "binder raw material" is a compound contained in the paint composition, and is a raw material of the "binder component" present in the layer formed by the painting step, the drying step and the hardening step of the paint composition. That is, the material that is obtained due to the hardening of the binder raw material contained in the paint composition and that is contained in the forming material and/or the layer is termed the binder component. Incidentally, although there can be a case where some of the binder raw material exists in the forming material in a state substantially the same as the state in the paint composition (a case where some of the binder raw material remains in an unreacted state), such binder raw material in the forming material in such a case is still termed the binder component.

Although the binder raw material in the paint composition is not particularly limited, it is preferred to be a binder raw material that can be hardened by heat and/or active energy rays or the like, from a viewpoint of manufacturability. The binder raw material in the paint composition may be of one kind or of two or more kinds that are mixed for use.

Furthermore, from the viewpoint of retaining the particle in the layer, it is preferable that a monomer or an oligomer that has, in its molecule, an alkoxy group, a silanol group, a reactivity double bond, and a functional group capable of ring-opening reaction be the binder raw material. Still further, in the case where the binder raw material is hardened by UV rays, the oxygen inhibition can be prevented, so that it is preferable that the oxygen concentration be as low as possible, and that the binder raw material is more preferred to harden in an anaerobic atmosphere. There can be a case where reduction in the oxygen concentration improves the hardening state of the outermost surface, and better the anti-chemical resistance.

Such a binder raw material in the paint composition is, concretely, preferred to be a multifunctional acrylate monomer, an oligomer, an alkoxysilane, an alkoxysilane hydrolysate or an alkoxysilane oligomer, and more preferred to be a multifunctional acrylate monomer or an oligomer.

As for examples of the multifunctional acrylate monomer, it is possible to use a multifunctional acrylate having 3 (more preferably 4 or 5) or more (meth)acryloyloxy groups in one molecule or a modified polymer thereof, concretely, pentaerythritol tri(meth)acrylate, pentaerythritol tetra(meth) acrylate, dipentaerythritol tri(meth)acrylate, dipentaerythritol tetra(meth)acrylate, dipentaerythritol penta(meth) acrylate, dipentaerythritol hexa(meth)acrylate, trimethylol propane tri(meth)acrylate, pentaerythritol triacrylate hexane methylene diisocyanate urethane polymer and the like. As for these monomers, it is possible to one species or two or more species mixed. Incidentally, it is assumed that the "(meth) acrylates" collectively represent acrylates and methacrylates, and the "(meth)acryloyloxy groups" collectively represent acryloyloxy groups and methacryloyloxy groups. (This applies also in the cases where a "(meth)acry . . . " in the compound other than the aforementioned cases.)

On the other hand, as examples of the multifunctional acrylate oligomer there can be cited epoxy acrylate, urethane acrylate, polyester acrylate and the like. However, to obtain a surface configuration of the forming material, urethane acrylate is preferred. Still further, from the viewpoint of dispersion of particles, of the urethane acrylates, ones that have, in a polyol skeleton, alicyclic hydrocarbon (cyclohexyl, tricyclodecanyl, isobonyl skeleton) and that are made of up unit structures that have 9 (more preferably, 12) or more (meth) acryloyloxy groups in one molecule.

The Hansen's solubility parameters of these binder raw materials are characterized according to their functional groups. For the Hansen's solubility parameter of the binder raw material there exists a preferred condition. Concretely, when in the Hansen's solubility parameter of the fluorine compound A, the dispersion term is $\sigma_d$, the polarity term is $\sigma_p$, and the hydrogen bond term is $\sigma_h$, and in the Hansen's solubility parameter of the binder component, the dispersion term is $\sigma_{Bp}$ and the hydrogen bond term is $\sigma_{Bh}$, the parameter R defined by $R=[(\sigma_d-\sigma_{Bd})^2+(\sigma_p-\sigma_{Bp})^2+(\sigma_h-\sigma_{Bh})^2]^{1/2}$ is preferred to have a value greater than or equal to 3 $(MPa)^{1/2}$ and less than or equal to 12 $(MPa)^{1/2}$, more preferred to have a value greater than or equal to 3 $(MPa)^{1/2}$ and less than or equal to 8 $(MPa)^{1/2}$, and particularly preferred to have a value greater than or equal to 4 $(MPa)^{1/2}$ and less than or equal to 6 $(MPa)^{1/2}$. In the case where the parameter R exceeds 12 $(MPa)^{1/2}$, there can be a case where transparency or glossiness declines. On the other hand, in the case where the parameter R is less than 3 $(MPa)^{1/2}$ or the case where $\sigma_d<\sigma_{Bd}$ is not satisfied, there can be a case where the amount of fingerprint deposition increases.

Furthermore, as for examples of commercially s multifunctional acryl-based compositions there can be cited MITSUBISHI RAYON CO., LTD. (trade name "Diabeam (registered trademark)" series or the like), NAGASE & CO., LTD. (trade name "Denacol (registered trademark)" series or the like), Shin-Nakamura Chemical Co., Ltd (trade name "NK Ester" series or the like), DIC Corporation (trade name "UNIDIC (registered trademark)" or the like), Toagosei Chemical Industry Co., Ltd. ("Aronix (registered trademark)" series or the like), NOF CORPORATION ("BLEMMER (registered trademark)" series or the like), Nippon Kayaku Co., Ltd. (trade name "KAYARAD (registered trademark)" series or the like), Kyoeisha Chemical Co., Ltd. (trade name "LIGHT ESTER" series or the like) or the like, and these products can be utilized.

Particle

The paint composition and the layer that the forming material are preferred to contain a particle. Note herein that the particle may be either one of an inorganic particle and an organic particle, but is preferred to be an inorganic particle from the viewpoint of endurance.

The number of kinds of inorganic particles is preferred to be greater than or equal to one kind and less than or equal to twenty kinds. The number of inorganic particles is more preferred to be greater than or equal to one kind and less than or equal to ten kinds Note herein that the "inorganic particle" includes one that has been subjected to surface treatment. This surface treatment refers to introduction of a compound to the particle surface via chemical bonding (including covalent bonding, hydrogen bonding, ionic binding, Van der Waals binding, hydrophobic bonding and the like) or adsorption (including physical adsorption or chemical adsorption).

Note herein that the kinds of the inorganic particle are determined by the kinds of elements that constitute the inorganic particles, and that if any surface treatment is to be performed, the kinds of the inorganic particle are determined by the kinds of elements that constitute the particles prior to the surface treatment. For example, titanium oxide ($TiO_2$) and nitrogen-doped titanium oxide ($TiO_{2-x}N_x$) in which one or more of oxygens of titanium oxide have been substituted with nitrogens, which are anion, are different kinds of inorganic particles since they are different in the elements that constitute the inorganic particles. Furthermore, provided that the particles are particles made up of the same element, for example, particles (ZnO) made up of only Zn and O, these particles are of the same kind of particles even if a plurality of particles that are different in the number average particle diameter are present, or even if the composition ratios of Zn and O are different from each other. Furthermore, even if there exist a plurality of Zn particles varying in oxidation number, these are the same kind of particles as long as the elements that constitute the particles are the same (as long as all the elements other than Zn are the same).

Although the inorganic particle is not particularly limited, the inorganic particle is preferred to be an oxide, a nitride, a boride, a chloride, a carbonate or a sulfate of a metal or a semimetal. The inorganic particle may be a composite oxide that includes two kinds of metal or semimetal, and may have a different element introduced in a lattice, or have a lattice point substituted with a different kind of element, or have a lattice defect introduced.

The inorganic particle is further preferred to be an oxide particle obtained through oxidation of at least one metal or semimetal selected from the set constituting of Si, Al, Ca, Zn, Ga, Mg, Zr, Ti, In, Sb, Sn, Ba and Ce.

Concretely, the inorganic particle is of at least one metal oxide or semimetal oxide selected from the set consisting of silica ($SiO_2$), aluminum oxide ($Al_2O_3$), zinc oxide (ZnO), zirconium oxide ($ZrO_2$), titanium oxide ($TiO_2$), indium oxide ($In_2O_3$), tin oxide ($SnO_2$), antimone oxide ($Sb_2O_3$) and indium tin oxide ($In_2O_3$). Particularly preferably, the inorganic particle is of silica ($SiO_2$).

The number average particle diameter of the inorganic particle is preferred to be greater than or equal to 5 nm and less than or equal to 250 nm. If the number average particle diameter of the inorganic particle is smaller than 5 nm, there can be a case where the capability of forming asperities is insufficient, and if it is larger than 250 nm, there can be a case where glossiness declines.

Still further, although the form of the inorganic particle is not particularly limited, the inorganic particle is preferred to be an inorganic particle that has a long-chain structure in which silica is connected in a moniliform (a configuration in which a plurality of silica are connected in a form of chain), or an inorganic particle in which connected silica has branches or bends. Hereinafter, these will be termed the moniliform connected and/or branched silica.

The moniliform connected and/or branched silica refers to a silica wherein primary particles of silica are bonded to each other with a bi- or more-valent metal ion intervening therebetween, and wherein at least 3 such particles or more and, preferably, 5 such particles or more and, more preferably, 7 such particles or more are connected. The state of connection, branching and bending of the moniliform connected and/or branched silica can be checked by using a scanning type electron microscope (SEM). As commercially sold articles of this moniliform connected and/or branched silica, for example, PS-S and PS-M (water dispersion), IPA-ST (IPA dispersion) and MEK-ST (MEK dispersion) by Nissan Chemical Industries, Ltd., PL-1-IPA (IPA dispersion) and PL-1-MEK (MEK dispersion) by FUSO CHEMICAL CO., LTD. or the like can be cited. These produces can be utilized.

To obtain a particularly preferred surface configuration, it is particularly preferred that the above-described moniliform connected and/or branched silica is provided a surface modification that is needed for the silica to be stably dispersed in a good solvent for the binder raw material. For example, in the case where an acryl-based monomer or oligomer is used as a binder raw material, it is preferred that as the surface modification, an alkyl group, an alkenyl group, a vinyl group, a (meth)acryl group and the like whose carbon number is 1 to 5 or less be introduced in a minimum amount onto the surface. A commercially sold article that satisfies this is, for example, MEK-ST-UP (MEK dispersion).

The number average particle diameter of the inorganic particle means a number-reference arithmetic mean length diameter described in JIS Z8819-2 (2001 edition) and, for each of the forming material and the paint composition, is a value obtained by observing primary particles through the use of a scanning type electron microscope (SEM), a transmission type electron microscope and the like, and determining the diameter of a circumcircle of each primary particle as an equivalent particle diameter, and finding a number average value of those equivalent particle diameters on the basis of the foregoing standard, as described later.

In the case of the forming material, it is possible to find the number average particle diameter by observing the surface or a cross section. Furthermore, in the case of the paint composition, it is possible to do an observation using a sample prepared by dropping a paint composition diluted by a solvent and then drying it.

Solvent

The paint composition may include solvent. The number of kinds of the solvents is preferred to be greater than or equal to 1 kind and less than or equal to 20 kinds, more preferred to be greater than or equal to 1 kind and less than or equal to 10 kinds, and even more preferred to be greater than or equal to 1 kind and less than or equal to 6 kinds Note herein that the "solvent" refers to a substance that is liquid at normal temperature and normal pressure and that can be substantially entirely evaporated in the drying step after the painting step.

Note herein that the kind of a solvent is determined by the molecular structure that constitutes the solvent. That is, materials that are the same in element composition and the same in the kinds and number of functional groups, but that are different in the bonding relation (structural isomers), and materials that are not the structural isomers but that do not exactly match each other in the three-dimensional space whatever conformation the materials are caused to assume (stereoisomers) are handled as solvents that are different in kind. For example, 2-propanol and n-propanol are handled as different solvents.

Other Additives

The paint composition is preferred to further contain a photopolymerization initiator, a hardening agent and a catalyst.

The photopolymerization initiator and the catalyst are used to promote reactions between inorganic particles, between binder raw materials, and between the inorganic particle and the binder raw material. The photopolymerization initiator is preferred to be one that is able to initiate or promote the polymerization and/or silanol condensation and/or a crosslinking reaction.

As for the photopolymerization initiator, the hardening agent and the catalyst, various kinds of them can be used. Furthermore, a plurality of photopolymerization initiators may be simultaneously used, or a photopolymerization initiator may be singly used. Still further, an acidic catalyst or a thermal polymerization initiator may be used together with the photopolymerization initiator. As examples of the acidic catalyst there can be cited hydrochloric acid aqueous solution, formic acid, acetic acid and the like can be cited. As examples of the thermal polymerization initiator there can be cited peroxides and azo compounds. Furthermore, as examples of the photopolymerization initiator there can be cited alkyl phenone-based compounds, sulfate-containing based compounds, acyl phosphine oxide-based compounds, amine-based compounds and the like. However, the photopolymerization initiator is not limited to these compounds. In terms of hardening property, alkyl phenone-based compounds are preferred; as concrete examples thereof, there can be cited 2,2-dimethoxy-1,2-diphenyl ethane-1-on, 2-methyl-1-(4-methylthiophenyl)-2-morpholinopropane-1-on, 2-benzyl-2-dimethylamino-1-(4-phenyl)-1-butane, 2-(dimethylamino)-2-[(4-methylphenyl)methyl]-1-(4-phenyl)-1-butane, 2-benzyl-2-dimethylamino-1-(4-morpholinophenyl)-1-butane, 2-(dimethylamino)-2-[(4-methylphenyl)methyl]-1-[4-(4-morpholinyl)phenyl]-1-butane, 1-cyclohexyl-phenyl ketone, 2-methyl-1-phenylpropane-1-on, 1-[4-(2-ethoxy)-phenyl]-2-hydroxy-2-methyl-1-propane-1-on and the like.

Incidentally, the content proportion of the photopolymerization initiator, the hardening agent and the catalyst is preferred to be 0.001 mass part to 30 mass parts relative to 100 mass parts of the total sum of the binder raw material in the paint composition, and is more preferred to be 0.05 mass part to 20 mass parts, and even more preferably 0.1 mass part to 10 mass parts.

The paint composition may further contain an additive such as a surface-active agent, a thickening agent or a leveling agent, as appropriate according to need.

Contents of Various Components in Paint Material Composition

The paint composition contains a fluorine compound A, a binder raw material and a particle. A relation among their individual masses in the paint composition will be described.

There is preferably shown an example in which in 100 mass % of the paint composition, the fluorine compound A is contained at greater than or equal to 0.025 mass % and less than or equal to 7 mass %, the particle is at greater than or equal to 0.2 mass % and less than or equal to 55 mass %, the binder raw material is at greater than or equal to 0.8 mass % and less than or equal to 66 mass %, and a solvent is at greater than or equal to 30 mass % and less than or equal to 95 mass %, other components such as an initiating agent, a hardening agent, catalyst and other components, are at greater than or equal to 0.025 mass % and less than or equal to 7 mass %. More preferably, the fluorine compound A is at greater than or equal to 0.05 mass % and less than or equal to 6 mass %, the particle is at greater than or equal to 0.4 mass % and less than or equal to 36 mass %, the binder raw material is greater than or equal to 3.2 mass % and less than or equal to 56 mass %, the solvent is at greater than or equal to 40 mass % and less than or equal to 90 mass %, and other components such as an initiating agent, a hardening agent or a catalyst are at greater than or equal to 0.05 mass % and less than or equal to 6 mass %.

Support Substrate Material

The forming material is a forming material in which the "layer" is provided on a support substrate material. This support substrate material is preferred to be of a planar shape. The material of the support substrate material is not particularly limited, and may be any of a glass plate, a plastic film, a plastic sheet, a plastic lens and a metal plate.

In the case where a plastic film or a plastic sheet is used as the support substrate material, examples include cellulose esters (e.g., triacetyl cellulose, diacetyl cellulose, propionyl cellulose, butyryl cellulose, acetyl propionyl cellulose, nitro cellulose), polyamides, polycarbonates, polyesters (e.g., olyethylene terephthalate, polyethylene-2,6-naphthalene dicarboxylate, poly-1,4-cyclohexane dimethylene terephthalate, polyethylene-1,2-diphenoxy ethane-4,4'-dicarboxylate, polybutylene terephthalate), polystyrenes (e.g., syndiotactic polystyrene), polyolefins (e.g., polypropylene, polyethylene, polymethyl pentene), polysulfones, polyether sulfones, polyalylates, polyether imides, polymethyl methacrylates, polyether ketones and the like. Among these, triacetyl cellulose, polycarbonates, polyethylene terephthalate and polyethylene naphthalate in particular are preferred.

The surface of the support substrate material can be subjected to various surface treatments before the layer is formed Examples of the surface treatment include a chemical treatment, a mechanical treatment, a corona discharge treatment, a flame treatment, a ultraviolet irradiation treatment, a high-frequency treatment, a glow discharge treatment, an active plasma treatment, a laser treatment, a mixed-acid treatment and an ozone oxidation treatment. Among these, the glow discharge treatment, the ultraviolet irradiation treatment, the corona discharge treatment and the flame treatment are preferred, and the glow discharge treatment and the ultraviolet treatment are further preferred.

Production Method for Forming Material

The method of forming the "layer" on at least one of surfaces of the support substrate material is more preferred to be a method that includes a painting process that has a painting step of painting the paint composition and a drying step.

The painting method applied to the painting step is not particularly limited, but it is preferred to paint the paint material composition by a dip coating method, a roller coating method, a wire bar coating method, a gravure coating method, a die coating method (the specification of U.S. Pat. No. 2,681, 294) and the like. The production method for the paint composition will be described later.

Next, the drying step of drying a liquid membrane painted on the support substrate material or the like in the painting step will be described. The drying step is preferred to be accompanied by the heating of the liquid membrane, from the viewpoint of promoting the formation of a structure of the surface by the particle in the liquid membrane in addition to removing the solvent from the paint membrane formed on at least one of the surfaces of the support substrate material in the painting step.

With regard to the drying method, there can be cited heat-transfer drying (close adhesion to a high-temperature object), convection heat transfer (hot wind), radiation heat transfer (infrared ray), others (microwaves, induction heating) and the like. Among these, the methods that use convection heat transfer or radiation heat transfer are preferred in the production method, due to the need to accurately keep the drying speed consistent in the width direction as well. Still further, from the viewpoint of controlling the movement or orientation of the fluorine compound A to the surface and the progress of self-organization of the particle, the drying system that utilizes both radiation heat transfer and convection heat transfer is particularly preferred.

The drying process, generally, is divided into (A) a constant-rate drying period and (B) a falling-rate drying period. In the former, because the diffusion of solvent molecules on the liquid membrane surface into the atmosphere is a speed determinant for the drying, the drying speed is constant during this interval, and the drying speed is governed by temperature, wind speed and the evaporated solvent's partial pressure in the atmosphere, and the membrane surface temperature is a value determined by the heated air temperature and the evaporated solvent's partial pressure in the atmosphere, and becomes constant. In the latter, because the diffusion of the solvent within the liquid membrane is a speed determinant, the drying speed does not exhibit a constant value but continues to decrease during this interval, and is governed by the diffusion coefficient of the solvent within the liquid membrane, and the membrane surface temperature increases. Note herein that the drying speed represents the amount of solvent evaporation per unit time and per unit area, and is composed of the dimensions of $g \cdot m^{-2} \cdot s^{-1}$.

The drying speed has a preferred range, and is preferred to be less than or equal to $10 \: g \cdot m^{-2} \cdot s^{-1}$, and more preferred to be less than or equal to $5 \: g \cdot m^{-2} \cdot s^{-1}$ By setting the drying speed in the constant-rate drying interval in this range, unevenness resulting from inconsistency of the drying speed can be prevented.

Provided that a drying speed in the range greater than or equal to $0.1 \: g \cdot m^2 \cdot s^{-1}$ and less than or equal to $10 \: g \cdot m^{-2} \cdot s^{-1}$, there is no limitation to any specific wind speed or temperature.

In the production method, in the decreasing-rate drying period, densification due to arrangement of particles is performed as well as evaporation of residual solvent. In this process, since a time for arrangement of particles is needed, the membrane temperature increase speed during the decreasing-rate drying period has a preferred range, and is preferred to be less than or equal to $5°$ C./second, and more preferred to be less than or equal to $1°$ C./second.

Further, further hardening operation (hardening step) by radiation of heat or energy beam may be performed. In the hardening step, if the hardening is carried out by heat, the hardening reaction is preferred to be conducted at greater than or equal to $25°$ C. and less than or equal to $200°$ C., and, from the viewpoint of the activation energy for the hardening reaction, the hardening ration is more preferred to be carried out at greater than or equal to $100°$ C. and less than or equal to $200°$ C., and even more preferred to be carried out at greater than or equal to $130°$ C. and less than or equal to $200°$ C.

Furthermore, in the case where the hardening is carried out by energy beam, the energy beam is preferred to be an electron beam (EB beam) and/or ultraviolet beam (UV beam) in terms of versatility. In the case where the hardening is carried out by ultraviolet beam, the oxygen concentration is preferred to be as low as possible because this prevents oxygen inhibition, and more preferred to harden in a nitrogen atmosphere (nitrogen purge). In the case where the oxygen concentration is high, there can be a case where the hardening of the outermost surface is inhibited so that the hardening is insufficient and the anti-scratch property and the alkali resistance may become insufficient. As for the kinds of ultraviolet lamps to be used when ultraviolet ray is radiated, there can be cited, for example, a discharge lamp system, a flash system, a laser system, an electrodeless lamp system and the like. In the case where ultraviolet hardening is performed by using a high-pressure mercury lamp, that is, the discharge lamp system, the ultraviolet irradiation is preferred to be performed in such a condition that the illuminance of ultraviolet rays is 100 to 3000 $mW/cm^2$, and preferably 200 to 2000 $mW/cm^2$, and more preferably 300 to 1500 $mW/cm^2$. The ultraviolet irradiation is more preferred to be performed in such a condition that the accumulated amount of ultraviolet light is 100 to 3000 $mJ/cm^2$, preferably 200 to 2000 $mJ/cm^2$, and more preferably 300 to 1500 $mJ/cm^2$. Note herein that ultraviolet illuminance is illuminance intensity received per unit area, and changes depending on the lamp output, light emission spectral efficiency, the diameter of the light emitting valve, the design of a reflecting mirror, the light source distance relative to the irradiated object. However, the illuminance does not change depending on the conveyance speed. Note herein that the accumulated amount of ultraviolet light is the radiation energy received per unit area, and the total amount of photons that reach the surface. The accumulated amount of light is in inverse proportion to the irradiation rate at which passage occurs under a light source, and is proportional to the number of times of irradiation and the number of lamps.

Production Method for Paint Material Composition

The paint composition is obtained by mixing the fluorine compound A, the particle and the binder raw material and, furthermore, a solvent and an additive (an initiating agent, a hardening agent, a catalyst and the like). The production method for the composition is obtained by metering prescribed amounts of the components by mass or volume and mixing these components by stirring. At this time, it is also permissible to additionally perform a de-solvating treatment via depressurization or a reverse osmosis membrane, a dehydration treatment via a molecular sieve, an ion exchange treatment via an ion exchange resin or the like.

The stirring condition and the stirring device at the time of preparation of the paint composition are not particularly limited; however, it suffices that a device and a rotation speed that are necessary for the entire liquid to sufficiently mix are secured. It is preferable that the local shearing speed in the liquid is smaller than $10^4 \: S^{-1}$ and the Reynolds number is in a range greater than or equal to 1000 to prevent aggregation due to shearing fracture of a particle dispersion, aggregation due to local residence, and mixture failure.

The particle may be added in the form of either particle dispersion or powder. However, handling the particle in the form of particle dispersion is preferred in light of prevention of aggregation or production of extraneous material. In the case where powder of the particle is handled as a raw material, it is preferable that the particle goes through a step in which the particle is dispersed in a solvent (dispersion solvent) by any of various dispersers such as a media disperser or the like. As the prescribed amount in the case of addition as a particle dispersion, it is possible to use the mass of the particle found from the multiplication product of the solid content concentration of the particle dispersion and the mass of the particle dispersion.

As for measurement of the solid content concentration, after an aluminum dish (whose mass is $W_1$) is loaded with about 2 g of the particle dispersion weighed (the mass of which is $W_2$), the particle dispersion on the aluminum dish is dried for one hour within a hot air oven at $120°$ C. Then, after being cooled to $25°$ C. in a desiccator, the aluminum dish with the particle dispersion is weighed (the mass of which is $W_3$). The solid content concentration can be found in accordance with the following expression:

$$\text{Solid content concentration} = (W_3 - W_1)/(W_2 - W_1) \times 100.$$

As for the obtained paint composition, an appropriate filtering treatment may be performed before the painting. As for this appropriate filtering treatment, it is preferred to select a filter material and a filter opening size in accordance with the polarity state of the surface of the particle and the solvent and perform the filtering in a pressure condition in accordance with the filter structure and the shearing speed that will not destroy the dispersed state of the particle dispersion.

EXAMPLES

Next, our materials, compositions and methods will be described with reference to examples. However, this disclosure is not necessarily limited to the examples.

Fluorine Compound A

Fluorine Compound A1

As a fluorine compound A1, a fluorine-containing dendrimer was used. The synthesis method for the compound was as follows.

32 g of toluene was placed in a reaction flask of 200 mL. Then, while stirring was performed, nitrogen was caused to flow into the flask for 5 minutes, and the inside temperature was heating until refluxed (the temperature was greater than or equal to 110° C.). In another reaction flask of 100 mL, 4.0 g (20 mmol) of ethylene glycol dimethacrylate (EGDMA), 8.6 g (20 mmol) of 2-(perfluorohexyl)ethyl methacrylate (C6FM), 2.3 g (10 mmol) of 2,2-dimethyl azobisisobutyrate (MAIB) and 32 g of toluene were placed. Then, while stirring was performed, nitrogen was caused to flow into the flask for 5 minutes to perform nitrogen substitution. Then, cooling was performed to 0° C. by water bath.

The content of the aforementioned reaction flask of 100 mL in which EGDMA, C6FM and MAIB had been placed was dropped into the refluxed toluene in the above-described 200-mL reaction flask, by using a dropping pump. After the dropping ended, aging was let to occur for 1 hour.

Next, this reaction liquid was added to 277 g of hexane/toluene (mass ratio of 4:1) to precipitate a polymer in a slurry state. This slurry was subjected to reduced-pressure filtration, and was re-dissolved by using 36 g of THF. This THF solution of the polymer was added to 277 g of hexane to reprecipitate the polymer in a slurry state. This slurry was subjected to reduced-pressure filtration and then reduced-pressure drying, so that white powder of the object substance (fluorine compound A1) was obtained. The weight average molecular weight Mw of the obtained object substance measured in terms of polystyrene by GPC was 16000, and the degree of dispersion Mw/Mn was 1.8.

Fluorine Compound A2

As a fluorine compound A2, a fluorine-containing dendrimer was used. The synthesis method for the compound was as follows.

The object substance (fluorine compound A2) was obtained in substantially the same manner as in the synthesis of the fluorine compound A1, except that C6FM was replaced with 2.5 g (6 mmol) of 2-(perfluorohexyl)ethyl acrylate (C6FA). The weight average molecular weight Mw of the obtained object substance measured in terms of polystyrene by GPC was 14000, and the degree of dispersion Mw/Mn was 3.0.

Fluorine Compound A3

As a fluorine compound A3, a fluorine-containing dendrimer (FA-200, by Nissan Chemical Industries, Ltd.) was used.

Fluorine Compound A4

As a fluorine compound A4, a compound $CF_3OC_2F_4OCF_2CH_2OCOCH=CH_2$ containing a fluoropolyether site was used.

Fluorine Compound A5

As a fluorine compound A5, a compound $C_4F_9O(C_2F_4O)_2CF_2CH_2OCOCH=CH_2$ containing a fluoropolyether site was used.

Fluorine Compound A6

As a fluorine compound A6, a compound $C_6F_{13}OC_2F_4OCF_2CH_2OCOCH=CH_2$ containing a fluoropolyether site was used.

Fluorine Compound A7

As a fluorine compound A7, a compound (RS-75, by DIC Corporation) containing a fluoropolyether site was used.

Fluorine Compound A8

As a fluorine compound A8, a compound (triacryloyl-heptaidecafluorononenyl-pentaerythritol, by Kyoeisha Chemical Co., Ltd.) containing a fluoroalkyl site was used.

Fluorine Compound A9

As a fluorine compound A9, a compound (perfluorooctyl ethyl acrylate, by DAIKIN INDUSTRIES, LTD containing a fluoroalkyl site was used.

Creation of Paint Material Composition

Paint Material Composition 1

A paint composition 1 was obtained by mixing the following materials:
  Fluorine compound A: fluorine compound A1; 0.04 mass part
  Particle: linked organosilica sol MEK-ST-UP; 40 mass parts
  Binder: KAYARAD DPHA (Nippon Kayaku Co., Ltd.); 32 mass parts
  Solvent: MIBK; 27.1 mass parts
  Photopolymerization initiator: 1-hydroxy-cyclohexyl-phenyl-ketone (Irgacure 184 by BASF company); 1 mass part.

Paint Material Compositions 2 to 9

As shown Table 1, paint compositions 2 to 9 were obtained in substantially the same manners as the paint composition 1, except that the fluorine compounds A2 to A9 replaced the fluorine compound A1.

Paint Material Composition 10

A paint composition 10 was obtained by mixing the following materials:
  Fluorine compound A: fluorine compound A7; 0.04 mass part
  Particle: linked organosilica sol MEK-ST-UP (by Nissan Chemical Industries, Ltd., a solid content concentration of 20%); 40 mass parts
  Binder: urethane acrylate KRM8655 (Daicel-Cytec Co., Ltd.); 32 mass parts
  Solvent: MIBK; 7.1 mass parts
  Photopolymerization initiator: 1-hydroxy-cyclohexyl-phenyl-ketone (Irgacure 184 by BASF company); 1 mass part.

Paint Material Composition 11

A paint composition 11 was obtained by mixing the following materials:
  Fluorine compound A: fluorine compound A3; 0.03 mass part
  Particle: organoaluminum sol GA-10P (by Nissan Chemical Industries, Ltd. solid content concentration 10%); 59.9 mass parts
  Binder: KAYARAD DPHA (Nippon Kayaku Co., Ltd.); 24 mass parts
  Solvent: MIBK; 15.3 mass parts
  Photopolymerization initiator: 1-hydroxy-cyclohexyl-phenyl-ketone (Irgacure 184 by BASF company); 0.7 mass parts.

Paint Material Composition 12

A paint composition 12 was obtained by mixing the following materials:
  Fluorine compound A: fluorine compound A3; 0.04 mass part
  Particle: linked organosilica sol MEK-ST-UP (by Nissan Chemical Industries, Ltd., solid content concentration 20%); 40 mass parts
  Binder: KAYARAD PET 30 (Nippon Kayaku Co., Ltd.); 32 mass parts
  Solvent: MIBK; 27.1 mass parts
  Photopolymerization initiator: 1-hydroxy-cyclohexyl-phenyl-ketone (Irgacure 184 by BASF company); 1 mass part.

Paint Material Composition 13

A paint composition 13 was obtained by mixing the following materials:
  Fluorine compound A: fluorine compound A3; 0.04 mass part
  Particle: organosilica sol MEK-ST-UP (by Nissan Chemical Industries, Ltd., a solid content concentration of 20%); 40 mass parts
  Binder: urethane acrylate KRM8655 (Daicel-Cytec Co., Ltd.); 32 mass parts
  Solvent: MIBK; 27.1 mass parts
  Photopolymerization initiator: 1-hydroxy-cyclohexyl-phenyl-ketone (Irgacure 184 by BASF company); 1 mass part.

Paint Material Composition 14

A paint composition 14 was obtained by mixing the following materials:
- Fluorine compound A: fluorine compound A3; 0.04 mass part
- Particle: organosilica sol IPA-ST-ZL (by Nissan Chemical Industries, Ltd. solid content concentration 30%); 8 mass parts
- Binder: KAYARAD DPHA (Nippon Kayaku Co., Ltd.); 32 mass parts
- Solvent: MIBK; 40 mass parts
- Photopolymerization initiator: 1-hydroxy-cyclohexyl-phenyl-ketone (Irgacure 184 by BASF company); 1 mass part.

Paint Material Composition 15

A paint composition 15 was obtained by mixing the following materials:
- Fluorine compound A: fluorine compound A3; 0.04 mass part
- Particle: organosilica sol IPA-ST-L (by Nissan Chemical Industries, Ltd. solid content concentration 30%); 8 mass parts
- Binder: KAYARAD DPHA (Nippon Kayaku Co., Ltd.); 32 mass parts
- Solvent: MIBK; 40 mass parts
- Photopolymerization initiator: 1-hydroxy-cyclohexyl-phenyl-ketone (Irgacure 184 by BASF company); 1 mass parts.

Paint Material Composition 16

A paint composition 16 was obtained by mixing the following materials:
- Fluorine compound A: fluorine compound A3; 0.04 mass part
- Particle: organosilica sol MIBK-SD-L (by Nissan Chemical Industries, Ltd. solid content concentration 30%); 8 mass parts
- Binder: KAYARAD DPHA (Nippon Kayaku Co., Ltd.); 32 mass parts
- Solvent: MIBK; 40 mass parts
- Photopolymerization initiator: 1-hydroxy-cyclohexyl-phenyl-ketone (Irgacure 184 by BASF company); 1 mass part.

Paint Material Composition 17

A paint composition 17 was obtained by mixing the following materials:
- Fluorine compound A: fluorine compound A3; 0.04 mass part
- Particle: organosilica sol MIBK-SD (Nissan Chemical Industries, Ltd. solid content concentration 30%); 8 mass parts
- Binder: KAYARAD DPHA (Nippon Kayaku Co., Ltd.); 32 mass parts
- Solvent: MIBK; 40 mass parts
- Photopolymerization initiator: 1-hydroxy-cyclohexyl-phenyl-ketone (Irgacure 184 by BASF company); 1 mass parts.

Paint Material Composition 18

A paint composition 18 was obtained by mixing the following materials:
- Fluorine compound A: fluorine compound A3; 0.03 mass part
- Particle: organosilica sol OSCAL (by JGC Catalysts and Chemicals Ltd., a solid content concentration of 5%); 59.9 mass parts
- Binder: KAYARAD DPHA (Nippon Kayaku Co., Ltd.); 27 mass parts
- Solvent: MIBK; 12.3 mass parts
- Photopolymerization initiator: 1-hydroxy-cyclohexyl-phenyl-ketone (Irgacure 184 by BASF company); 0.81 mass part.

Paint Material Composition 19

A paint composition 19 was obtained by mixing the following materials:
- Fluorine compound A: fluorine compound A3; 0.04 mass part
- Particle: silica particle Hyprecica SP 300 nm (UBENITTO KASEI CO., LTD., powder); 4 mass parts
- Binder: KAYARAD DPHA (Nippon Kayaku Co., Ltd.); 36 mass parts
- Solvent: MIBK; 58.9 mass parts
- Photopolymerization initiator: 1-hydroxy-cyclohexyl-phenyl-ketone (Irgacure 184 by BASF company); 1.1 mass parts.

Paint Material Composition 20

A paint composition 20 was obtained by mixing the following materials:
- Fluorine compound A: fluorine compound A3; 0.04 mass part
- Particle: linked organosilica sol MEK-ST-UP (Nissan Chemical Industries, Ltd., a solid content concentration of 20%); 10 mass parts
- Binder: KAYARAD DPHA (Nippon Kayaku Co., Ltd.); 38 mass parts
- Solvent: MIBK; 50.9 mass parts
- Photopolymerization initiator: 1-hydroxy-cyclohexyl-phenyl-ketone (Irgacure 184 by BASF company); 1.1 mass parts.

Paint Material Composition 21

A paint composition 21 was obtained by mixing the following materials:
- Fluorine compound A: fluorine compound A3; 0.03 mass part
- Particle: linked organosilica sol MEK-ST-UP (Nissan Chemical Industries, Ltd. solid content concentration 30%); 80 mass parts
- Binder: KAYARAD DPHA (Nippon Kayaku Co., Ltd.); 15 mass parts
- Solvent: MIBK; 9.6 mass parts
- Photopolymerization initiator: 1-hydroxy-cyclohexyl-phenyl-ketone (Irgacure 184 by BASF company); 0.4 mass part.

Paint Material Composition 22

A paint composition 22 was obtained by mixing the following materials:
- Particle: linked organosilica sol MEK-ST-UP (Nissan Chemical Industries, Ltd., a solid content concentration of 20%); 40 mass parts
- Binder: KAYARAD DPHA (Nippon Kayaku Co., Ltd.); 32 mass parts
- Solvent: MIBK; 27 mass parts
- Photopolymerization initiator: 1-hydroxy-cyclohexyl-phenyl-ketone (Irgacure 184 by BASF company); 1 mass parts.

Paint Material Composition 23

A paint composition 23 was obtained by mixing the following materials:
- Fluorine compound A: fluorine compound A3; 0.04 mass part
- Binder: KAYARAD DPHA (Nippon Kayaku Co., Ltd.); 40 mass parts
- Solvent: MIBK; 58.8 mass parts
- Photopolymerization initiator: 1-hydroxy-cyclohexyl-phenyl-ketone (Irgacure 184 by BASF company) 1.2 mass parts.

Paint Material Composition 24

A paint composition 24 was obtained by mixing the following materials:
Fluorine compound A: fluorine compound A3; 0.04 mass part
Particle: linked organosilica sol MEK-ST-UP (Nissan Chemical Industries, Ltd., a solid content concentration of 20%); 99.1 mass parts.

Paint Material Composition 25

A paint composition 25 was obtained by mixing the following materials:
Fluorine compound A: fluorine compound A3; 0.04 mass part
Particle: silica particle Hyprecica SP 600 nm (UBENITTO KASEI CO., LTD., powder); 4 mass parts
Binder: KAYARAD DPHA (Nippon Kayaku Co., Ltd.); 36 mass parts
Solvent: MIBK; 58.9 mass parts
Photopolymerization initiator: 1-hydroxy-cyclohexyl-phenyl-ketone (Irgacure 184 by BASF company); 1.1 mass parts.

Paint Material Composition 26

A paint composition 26 was obtained by mixing the following materials:
Fluorine compound A: fluorine compound A9; 0.04 mass part
Particle: organosilica sol MEK-ST-UP (by Nissan Chemical Industries, Ltd., a solid content concentration of 20%); 40 mass parts
Binder: "Denacol" acrylate DA-314 (Nagase ChemteX Corporation); 32 mass parts
Solvent: MIBK; 27.1 mass parts
Photopolymerization initiator: 1-hydroxy-cyclohexyl-phenyl-ketone (Irgacure 184 by BASF company); 1 mass parts.

Paint Material Composition 27

A paint composition 27 was obtained by mixing the following materials:
Fluorine compound A: fluorine compound A8; 0.04 mass part
Particle: organosilica sol MEK-ST-UP (by Nissan Chemical Industries, Ltd., a solid content concentration of 20%); 40 mass parts
Binder: XAFF-701 (DH Material Inc.); 32 mass parts
Solvent: MIBK; 27.1 mass parts
Photopolymerization initiator: 1-hydroxy-cyclohexyl-phenyl-ketone (Irgacure 184 by BASF company); 1 mass parts.

Paint Material Composition 28

A paint composition 28 was obtained by mixing the following materials:
Fluorine compound A: fluorine compound A3; 0.04 mass part
Particle: linked organosilica sol MEK-ST-UP (by Nissan Chemical Industries, Ltd., a solid content concentration of 20%); 40 mass parts
Binder: XAFF-701 (DH Material Inc.); 32 mass parts
Solvent: MIBK; 27.1 mass parts
Photopolymerization initiator: 1-hydroxy-cyclohexyl-phenyl-ketone (Irgacure 184 by BASF company); 1 mass part.

Creation Method 1 for Forming Material

As a support substrate material, "Lumirror" U46 (by Toray (K.K.)), having an easily adhesive coating material painted on an PET resin film, was used. The paint compositions 1 to 23 were painted in a condition of a conveyance speed of 10 m/minute, by using a continuous painting device that has a small-diameter gravure coater and an infrared panel heater in a front half portion of a drying chamber, while the number of gravure lines and the gravure roll speed ratio were adjusted so that the solid content paint membrane thickness became 2 μm. The condition of the wind that strikes the liquid membrane during the time from painting to drying and hardening.

First Drying
Blow temperature and humidity: temperature: 45° C., relative humidity: 10%
Wind speed: painted surface side: 5 m/sec, opposite side to the painted surface: 5 m/sec
Wind direction: painted surface side: parallel to the substrate material, opposite side to the painted surface: perpendicular to the substrate material
Residence time: 1 minute
Panel heater's set temperature:—(not used)

Second Drying
Blow temperature and humidity: temperature: 100° C., relative humidity: 1%
Wind speed: painted surface side: 5 m/sec, opposite side to the painted surface: 5 m/sec
Wind direction: painted surface side: perpendicular to the substrate material, opposite side to the painted surface: perpendicular to the substrate material
Residence time: 1 minute Hardening Step
radiation output: 600 W/cm$^2$, accumulated amount of light: 120 mJ/cm$^2$
oxygen concentration: 0.1 vol %

Incidentally, as the wind speed and the temperature and the humidity, measured values by a hot wire anemometer (Kanomax Japan, Inc. Anemomaster wind velocity/air flow meter MODEL 6034) were used. By the foregoing method, forming materials were made without using an infrared panel heater, for Examples 1 to 21 and Comparative Examples 1 to 7.

Creation Method 2 for Forming Material

Example 22 was made in substantially the same manner as in the creation method 1 for the forming material, except that a paint composition 4 was used and the condition for the first drying was changed as follows, that is, the drying method was changed to a drying method in which radiation heat transfer using an infrared panel heater was employed as well.

First Drying
Blow temperature and humidity: temperature: 45° C., relative humidity: 10%
Wind speed: painted surface side: 5 m/sec, opposite side to the painted surface: 5 m/sec
Wind direction: painted surface side: parallel to the substrate material, opposite side to the painted surface: perpendicular to the substrate material
Residence time: 1 minute
Panel heater's set temperature: 80° C.

Evaluation of Paint Material Composition

Number Average Particle Diameter (Primary Particle)

Observation and measurement were performed via a scanning type electron microscope (SEM). The observation specimens were prepared by diluting the paint composition with a dispersion solvent (isopropyl alcohol) to a solid content concentration of 0.5 mass %, performing dispersion by ultrasonic wave, dropping the dispersion onto an electroconductive tape, and then performing drying. As for the number average particle diameter, observation was performed at such a magnification ratio that the number of primary particles as conglomerates per field of view was greater than or equal to 10 and less than or equal to 50, the diameter of a circumcircle of a primary particle was found from an obtained image, and was determined as an equivalent particle diameter. The number of observations was increased to 100 of primary particles, and, from the values measured on the 100 primary particles, number average particle diameters were found on the basis of the number-reference arithmetic mean length diameter as described in JIS Z8819-2 (2001 edition).

Measurement of Hansen's Solubility Parameter 15 kinds of solvents different in solubility, that is, water, acetone, 2-butanone, cyclopentanone, isopropyl alcohol, ethanol, 1-octanol, toluene, hexane, acetic acid, butyl acetate, aniline, methane amide, 2-amino ethanol and 2-butoxy ethanol, were each added in a small amount at a time to the fluorine compound A and the binder component until complete dissolution was attained. Based on the saturated solutions' concentrations, the solubilities in each solvent were classified into 6 levels (6: insoluble, 5: a mass percentage concentration of less than 5%, 4: a mass percentage concentration of greater than or equal to 5% and less than 10%, 3: a mass percentage concentration of 10% and less than 30%, 2: a mass percentage concentration of greater than or equal to 30% and less than 50%, 1: a mass percentage concentration of greater than or equal to 50%). Based on the information on the solubilities in the solvents obtained in this manner, the Hansen's solubility parameters were calculated according to the Hansen Solubility Parameter in Practice (HSPiP) ver. 3.1.17 (http://www.hansen-solubility.com/index.php?id).

Parameter R

When in the Hansen's solubility parameter of the fluorine compound A, the dispersion term was $\sigma_d$, the polarity term was $\sigma_p$ and the hydrogen bond term was $\sigma_h$, and in the Hansen's solubility parameter of the binder component, the dispersion term is $\sigma_{Bp}$, the polarity term was $\sigma_{Bp}$ and the hydrogen bond term was $\sigma_{Bh}$, $$R=[(\sigma_d-\sigma_{Bd})^2+(\sigma_p-\sigma_{Bp})^2+(\sigma_h-\sigma_{Bh})^2]^{1/2}$$

was determined as the definition of the parameter R. Using the Hansen's solubility parameters of the fluorine compound A and the binder component calculated by the above-described method, calculations were performed.

Evaluation of Forming Material

With regard to the created forming materials, performance evaluations shown below were carried out, and results obtained are shown in Table 2. Unless otherwise specified, measurement was performed three times at different locations on each sample in each of the examples and the comparative examples.

60-Degree Specular Gloss Level

With regard to the gloss level of an object surface of the forming material, the gloss level of the forming material surface was measured as the 60-degree specular gloss level by a method according to JIS Z8741 (1997 edition), using VG7000 made by NIPPON DENSHOKU INDUSTRIES CO., LTD. Gloss levels of greater than or equal to 60% were determined as being acceptable Anti-Scratch Property Steel wool (#0000), imposing a load of 500 g/cm², was applied perpendicularly to anti-reflection members, and approximate numbers of scratches visible when 20 round-trip movements over a length of 1 cm were recorded, and were classified as follows, and were classified as follows. Grade 3 and higher grades were determined as being acceptable.

Grade 5: 0 scratch
Grade 4: greater than or equal to 1 scratch and less than 5 scratches
Grade 3: greater than or equal to 5 scratches and less than 10 scratches
Grade 2: greater than or equal to 10 scratches and less than 20 scratches
Grade 1: greater than or equal to 20 scratches Mock Fingerprint Deposition Deposition of a mock fingerprint to the forming material is made up of 1) preparation of a mock fingerprint liquid, 2) the making of a mock fingerprint sheet, 3) transfer of the mock fingerprint liquid from the mock fingerprint sheet to the silicone rubber, 4) deposition of the mock fingerprint from the silicone rubber to the forming material surface.

Preparation of the mock fingerprint liquid of 1) was attained by weighing materials shown below at proportions shown below, and then stirring the liquids by a magnetic stirrer for 30 minutes:

Oleic acid: 14 mass parts
Silica (number average particle diameter 2 μm): 6 mass parts
Isopropyl alcohol: 80 mass parts.

Incidentally, the number average particle diameter of silica was found in substantially the same manner as in the aforementioned method, except that observation samples were prepared by mixing the silica particle into a dispersion solvent (isopropyl alcohol) to a solid content concentration of 5 mass %, and dispersing the mixture via ultraviolet waves, and then dropping the dispersion onto an electroconductive tape.

The mock fingerprint sheets of 2) were obtained by painting, via a wire bar (#7), the fingerprint coating liquid onto the "Lumirror" U46 (by Toray (K.K.)), in which an easily adhesive coating material had been painted on a PET resin film as a support substrate material, and drying the liquid at 50° C. for 2 minutes.

The transfer of the mock fingerprint of 3) to the silicone rubber was performed in the following procedure. A silicone rubber having a rubber hardness of 50 according to JIS K6253 (1997 edition) was ground by a waterproof abrasive paper of #250. In this process, the surface roughness according to JIS B0601 (2001 edition) of the silicone rubber surface was greater than or equal to Ra=2 μm and less than or equal to 4 μm. Next, the silicone rubber ground by the waterproof abrasive paper was immersed and swollen with oleic acid overnight for impregnation. Subsequently, the silicone rubber subjected to the grinding and lipid-affinity imparting treatments was pressed at 30 KPa against the mock fingerprint sheet made in 2). The amount of deposition (g/m²) of the mock fingerprint liquid onto the silicone rubber refers to a value found from the area of the silicone rubber and the difference in mass between before and after the deposition. As a result of the foregoing technique, all the amounts of deposition were greater than or equal to 0.9 g/m² and less than or equal to 1.1 g/m².

As for the deposition of the mock fingerprint of 4) onto the forming material surface, the trace formed on the forming material surface by pressing the silicone rubber with the mock fingerprint liquid transferred thereto in 3) against the forming material surface at 30 KPa was assumed as a mock fingerprint.

Color Differences with Regular Reflected Light Included and with Regular Reflected Light Removed Between Before and after Fingerprint Deposition A black vinyl tape was stuck to an opposite surface to an object surface of each forming material, the reflected colors prior and subsequent to the deposition of the above-described mock fingerprint were measured by CIE 1976 (L*a*b*) described in JIS Z8730 (2009 edition), in the (de: 8°)Sb10W10 condition including the use of a specularly reflected light trap for the reflected color with regular reflected light removed, and in the (di: 8°)Sb10W10 condition without using the specularly reflected light trap for the reflected color with regular reflected light included, on the basis of JIS Z8722 (2009 edition), by using a CM-3600A spectrophotometer made by KONIKA MINOLTA, INC.

Furthermore, from the reflected colors before and after the deposition, ($\Delta E^*_{ab}$(di: 8°)Sb10W10) and ($\Delta E^*_{ab}$(de: 8°)Sb10W10) were found from the reflected colors before and after the deposition, by the calculation method described in JIS Z8730 (2009 edition). As for the color difference ($\Delta E^*_{ab}$(di: 8°)Sb10W10) prior and subsequent to the mock fingerprint deposition with regular reflected light included, 0.4 or less was determined as being acceptable. As for the color difference ($\Delta E^*_{ab}$(de: 8°)Sb10W10) prior and subsequent to the mock fingerprint deposition with regular reflected light removed, 4 or less was determined as being acceptable.

Amount of Deposition of Mock Fingerprint

The amount of deposition of the mock fingerprint onto the forming material surface was measured by measuring the Kα ray intensity of silicon contained in the mock fingerprint liquid through use of a wavelength-dispersive fluorescent X-ray device (scanning fluorescent X-ray analysis device ZSX-PrimusII made by Rigaku Denki). Concretely, the measurement of the Kα ray intensity of silicon was performed by the aforementioned device with regard to samples in which the mock fingerprint liquid was painted in a certain amount onto a PET film. In this manner, a working curve of the mock fingerprint deposition amount-silicon Kα ray intensity was made. Subsequently, the Kα ray intensity of silicon of the mock fingerprint deposited by the aforementioned method was measured, and the amount of deposition was calculated from the aforementioned working curve. As a result, the amounts of deposition of fingerprint which were obtained from results of the calculation and which were less than or equal to 0.1 g/m$^2$ were determined as being acceptable.

Measurement of Number of Peaks and Arithmetic Mean Roughness (Ra)

After the forming material was cut at arbitrary location, the surface configuration was observed and observation images were obtained, with the observation mode=DFM mode, the scanner=FS-20A, the cantilever=DF-3, the observation field of view=5×5 μm$^2$, the number of pixels=512×512, by using an atomic force microscope (NanoScope Ma ver. 5.31R1, made by Digital Instruments Company). Subsequently, to make 100% of the root-mean-square roughness a peak threshold value, analysis was performed with the "Peak Thrsh (% rms)" set to 100%, and the number of peaks was found. Incidentally, the aforementioned rms means the same as Rq, and indicates the root-mean-square roughness. Furthermore, based on the observation images, arithmetic mean roughness (Ra) was also found in a similar manner.

Anti-Fingerprint Property

As for the fingerprint deposition preventative property, each forming material was placed, with a surface for evaluation facing upward, on a black drawing paper, a finger (index finger) whose fingerprint was to be impressed was robbed against the thumb three times, and then was slowly pressed against the surface of the aforementioned layer, and the visibility of the deposited fingerprint was evaluated on the basis of a possible maximum of 10 in grade. Evaluation references are as follows:

Grade 10: The fingerprint is not visible, or the difference from a non-deposit portion is not perceptible.
Grade 7: The fingerprint is hardly visible, or not recognized as being a fingerprint.
Grade 5: The fingerprint is slightly visible, but hardly annoying.
Grade 3: The fingerprint is visible.
Grade 1: The fingerprint is clearly visible, and very annoying.

The aforementioned evaluation was conducted with respect to 10 subject persons, and average values thereof were found. The figures following the decimal point were handled by rounding off, and grades 5 and higher were determined as being acceptable.

Measurement of Oil Droplet Diameter

With respect to the mock fingerprints deposited on the forming material surface by the same method as with the above-described mock fingerprint deposition, surface projected images of droplets on the surface were shot using a differential interference microscope, and then oil droplet diameters $d_p$ were found by using an image processing software on the obtained images. On the basis of these results, area reference frequency distributions and transitions of the cumulative frequencies were found.

A concrete measurement procedure for the oil droplet diameter $d_p$ will be mentioned below.

First, images of a surface of each fingerprint preventative forming material to which a mock fingerprint had been deposited were shot at a magnification rate of 100 times. Subsequently, using image processing software, EasyAccess Ver6.7.1.23, each image was converted into a gray scale, and the white balance was adjusted so that the brightest portions and the darkest portions were accommodated on a tone curve of 8 bits, and, furthermore, the contrast was adjusted so that boundaries of oil droplets could be clearly distinguished. Next, using image analysis software, "Image 1.45s," pixels were binarized with the foregoing boundaries as borders, the areas taken by individual droplets were calculated. Then, oil droplet diameters were each found as the diameters of a circle to which the area of a region was approximated.

Area Reference Frequency Distribution

In the calculation of an area reference frequency distribution, a histogram was made on the basis of the oil droplet diameters $d_p$ obtained through the above-described process. At this time, the oil droplet diameters were divided every 5 μm, and on the basis of the divisions, stratification was performed by using the histogram function of Microsoft Excel 2003. Next, to weight the obtained histogram by the areas of surface projected images, the representative area of each stratum of the histogram was found on the assumption that the area is a circle whose representative diameter was set equal to the center value of the base numbers, and the representative areas of the strata were multiplied by the frequencies of their respective strata, and the multiplications were divided by the total area again. Thus, an area reference frequency distribution was found. Furthermore, with regard to the aforementioned area reference frequency distribution, the accumulated frequencies was turned into a graph whose vertical axis was the frequency and whose horizontal axis was the oil droplet diameter, and a median diameter $D_{50}$ was found from the value of the oil droplet diameter at the cumulative frequency of 50% Concretely, two strata at opposite sides of a point of the cumulative frequency of 50% are specifically determined from the histogram, and two coordinate points specifically determined by the cumulative frequency and the center value of the oil droplet diameters of the two strata were interconnected by a straight line, and the median diameter $D_{50}$ was calculated as the oil droplet diameter at the point corresponding to a cumulative frequency of 50% on the straight line.

The compositions of the paint compositions are collected in Table 1, and results of evaluation of the forming materials obtained are collected in Table 2. Any forming material that failed to be acceptable in even one item the evaluation items was judged as being yet to achieve the task.

As shown in Table 2, our Examples were acceptable in both gloss property and anti-fingerprint property, and achieved the tasks to be solved.

Table 2 shows values of the arithmetic mean roughness (Ra) measured under an atomic force microscope described in JIS R1683 (2007 edition) with respect to the forming materials of our Examples and Comparative Examples, which show that the superiority or inferiority in anti-fingerprint property and Ra do not correspond to each other.

Example 9, of which the parameters R of the fluorine compound A and the binder component were outside our preferred ranges, Examples 8 and 9, of which the fluorine compound A was outside our preferred range, Examples 11 and 14 to 19, in which the configuration of the particle the amount of deposition of the mock fingerprint, the number of peaks, the number average particle diameter and the particle configuration were outside our preferred ranges, were slightly inferior in anti-fingerprint property, but to extents that were allowable.

TABLE 1

| | Fluorine compound A Name | Particle Material | Number average particle diameter /nm | Configuration | Binder raw material |
|---|---|---|---|---|---|
| Paint composition 1 | Fluorine compound A1 | Silica | 15 | Moniliform connected and/or branched | DPHA |
| Paint composition 2 | Fluorine compound A2 | Silica | 15 | Moniliform connected and/or branched | DPHA |
| Paint composition 3 | Fluorine compound A3 | Silica | 15 | Moniliform connected and/or branched | DPHA |
| Paint composition 4 | Fluorine compound A4 | Silica | 15 | Moniliform connected and/or branched | DPHA |
| Paint composition 5 | Fluorine compound A5 | Silica | 15 | Moniliform connected and/or branched | DPHA |
| Paint composition 6 | Fluorine compound A6 | Silica | 15 | Moniliform connected and/or branched | DPHA |
| Paint composition 7 | Fluorine compound A7 | Silica | 15 | Moniliform connected and/or branched | DPHA |
| Paint composition 8 | Fluorine compound A8 | Silica | 15 | Moniliform connected and/or branched | DPHA |
| Paint composition 9 | Fluorine compound A9 | Silica | 15 | Moniliform connected and/or branched | DPHA |
| Paint composition 10 | Fluorine compound A7 | Silica | 15 | Moniliform connected and/or branched | KRM8655 |
| Paint composition 11 | Fluorine compound A3 | Alumina | 20 | Spherical | DPHA |
| Paint composition 12 | Fluorine compound A3 | Silica | 15 | Moniliform connected and/or branched | PET30 |
| Paint composition 13 | Fluorine compound A3 | Silica | 15 | Moniliform connected and/or branched | KRM8655 |
| Paint composition 14 | Fluorine compound A3 | Silica | 90 | Spherical | DPHA |
| Paint composition 15 | Fluorine compound A3 | Silica | 50 | Spherical | DPHA |
| Paint composition 16 | Fluorine compound A3 | Silica | 50 | Spherical | DPHA |
| Paint composition 17 | Fluorine compound A3 | Silica | 30 | Spherical | DPHA |
| Paint composition 18 | Fluorine compound A3 | Silica | 7 | Spherical | DPHA |
| Paint composition 19 | Fluorine compound A3 | Silica | 300 | Spherical | DPHA |
| Paint composition 20 | Fluorine compound A3 | Silica | 15 | Moniliform connected and/or branched | DPHA |
| Paint composition 21 | Fluorine compound A3 | Silica | 15 | Moniliform connected and/or branched | DPHA |
| Paint composition 22 | None | Silica | 15 | Moniliform connected and/or branched | DPHA |
| Paint composition 23 | Fluorine compound A3 | None | — | — | DPHA |
| Paint composition 24 | Fluorine compound A3 | Silica | 15 | Moniliform connected and/or branched | None |
| Paint composition 25 | Fluorine compound A3 | Silica | 600 | Spherical | DPHA |
| Paint composition 26 | Fluorine compound A9 | Silica | 15 | Moniliform connected and/or branched | DA-314 |
| Paint composition 27 | Fluorine compound A8 | None | — | — | XAFF701 |
| Paint composition 28 | Fluorine compound A3 | None | — | — | XAFF701 |

TABLE 2

| | Paint composition | Number of peaks number/ 25 μm$^2$ | Ra nm | Anti-scratch property 1 to 5 | Anti-fingerprint property 0 to 10 | Amount of mock fingerprint deposit g/m$^2$ | Color differences with regular reflection included and with regular reflection removed between before and after deposit of mock fingerprint | |
|---|---|---|---|---|---|---|---|---|
| | | | | | | | Regular reflection included $\Delta E^*_{ab}$(di: 8°) | Regular reflection removed $\Delta E^*_{ab}$(de: 8°) |
| Example 1 | Paint Composition 1 | 1010 | 2.1 | 5 | 9 | 0.001 | 0.15 | 1.2 |
| Example 2 | Paint Composition 2 | 1050 | 1.7 | 5 | 8 | 0.005 | 0.18 | 2.5 |
| Example 3 | Paint Composition 3 | 1200 | 2.4 | 5 | 9 | 0.001 | 0.14 | 1.3 |
| Example 4 | Paint Composition 4 | 1160 | 1.4 | 5 | 7 | 0.04 | 0.2 | 2 |
| Example 5 | Paint Composition 5 | 1310 | 1.5 | 5 | 8 | 0.005 | 0.16 | 2.6 |
| Example 6 | Paint Composition 6 | 1350 | 1.8 | 5 | 9 | 0.005 | 0.13 | 1.2 |
| Example 7 | Paint Composition 7 | 1280 | 2.7 | 5 | 9 | 0.001 | 0.1 | 1.4 |
| Example 8 | Paint Composition 8 | 980 | 2 | 5 | 5 | 0.08 | 0.35 | 3.5 |
| Example 9 | Paint Composition 9 | 1030 | 1.2 | 5 | 5 | 0.05 | 0.31 | 3.4 |
| Example 10 | Paint Composition 10 | 1370 | 2.4 | 5 | 9 | 0.001 | 0.1 | 1.2 |
| Example 11 | Paint Composition 11 | 1480 | 1.5 | 5 | 6 | 0.01 | 0.27 | 3 |

TABLE 2-continued

| | | | | | | | | |
|---|---|---|---|---|---|---|---|---|
| Example 12 | Paint Composition 12 | 1020 | 1.9 | 4 | 9 | 0.005 | 0.15 | 1.8 |
| Example 13 | Paint Composition 13 | 1250 | 2.2 | 4 | 8 | 0.01 | 0.14 | 2.3 |
| Example 14 | Paint Composition 14 | 520 | 3.8 | 4 | 5 | 0.2 | 0.34 | 3.9 |
| Example 15 | Paint Composition 15 | 820 | 2.3 | 4 | 7 | 0.05 | 0.32 | 2.9 |
| Example 16 | Paint Composition 16 | 1540 | 2.4 | 5 | 5 | 0.06 | 0.09 | 1.42 |
| Example 17 | Paint Composition 17 | 1860 | 1.8 | 5 | 5 | 0.05 | 0.11 | 3.8 |
| Example 18 | Paint Composition 18 | 2000 | 0.7 | 4 | 4 | 0.15 | 0.15 | 3.5 |
| Example 19 | Paint Composition 19 | 300 | 13 | 4 | 4 | 0.3 | 0.39 | 3.9 |
| Example 20 | Paint Composition 20 | 1400 | 1.2 | 4 | 7 | 0.01 | 0.1 | 1.5 |
| Example 21 | Paint Composition 21 | 800 | 3.5 | 5 | 7 | 0.01 | 0.3 | 3 |
| Example 22 | Paint Composition 4 | 1180 | 1.9 | 5 | 9 | 0.005 | 0.16 | 1.7 |
| Comparative Example 1 | Paint Composition 22 | 1020 | 3.4 | 5 | 0 | 0.5 | 0.6 | 5 |
| Comparative Example 2 | Paint Composition 23 | 3000 | 0.38 | 3 | 4 | 0.2 | 0.6 | 4.2 |
| Comparative Example 3 | Paint Composition 24 | 1800 | 4.5 | 1 | 3 | 0.5 | 0.6 | 2 |
| Comparative Example 4 | Paint Composition 25 | 400 | 28 | 5 | 6 | 0.1 | 0.2 | 2 |
| Comparative Example 5 | Paint Composition 26 | 860 | 1.1 | 4 | 6 | 0.1 | 0.28 | 2.1 |
| Comparative Example 6 | Paint Composition 27 | 3000 | 0.38 | 3 | 2 | 0.2 | 0.58 | 4.4 |
| Comparative Example 7 | Paint Composition 28 | 3000 | 0.38 | 3 | 1 | 0.2 | 0.58 | 4.5 |

| | 60-degree specular gloss level % | $\sigma_d$ $(MPa)^{1/2}$ | $\sigma_{Bd}$ $(MPa)^{1/2}$ | Parameter R $(MPa)^{1/2}$ | Median diameter $D_{50}$ μm |
|---|---|---|---|---|---|
| Example 1 | 80 | 19.2 | 21.6 | 5.6 | 44 |
| Example 2 | 80 | 18.8 | 21.6 | 7.2 | 52 |
| Example 3 | 80 | 19.7 | 21.6 | 7.1 | 46 |
| Example 4 | 80 | 17.6 | 21.6 | 9.6 | 56 |
| Example 5 | 80 | 17.1 | 21.6 | 8.8 | 49 |
| Example 6 | 80 | 18.2 | 21.6 | 7.9 | 44 |
| Example 7 | 80 | 16.1 | 21.6 | 6.3 | 41 |
| Example 8 | 80 | 15.8 | 21.6 | 8.1 | 63 |
| Example 9 | 80 | 13.3 | 21.6 | 10.3 | 61 |
| Example 10 | 80 | 16.1 | 20.3 | 4.7 | 35 |
| Example 11 | 80 | 19.7 | 21.6 | 7.1 | 65 |
| Example 12 | 80 | 19.7 | 22.4 | 7.6 | 42 |
| Example 13 | 80 | 19.7 | 20.3 | 8.9 | 51 |
| Example 14 | 75 | 19.7 | 21.6 | 7.1 | 76 |
| Example 15 | 80 | 19.7 | 21.6 | 7.1 | 68 |
| Example 16 | 80 | 19.7 | 21.6 | 7.1 | 61 |
| Example 17 | 80 | 19.7 | 21.6 | 7.1 | 71 |
| Example 18 | 80 | 19.7 | 21.6 | 7.1 | 59 |
| Example 19 | 65 | 19.7 | 21.6 | 7.1 | 77 |
| Example 20 | 80 | 19.7 | 21.6 | 7.1 | 79 |
| Example 21 | 75 | 19.7 | 21.6 | 7.1 | 60 |
| Example 22 | 80 | 17.6 | 21.6 | 9.6 | 63 |
| Comparative Example 1 | 80 | — | 21.6 | — | 500 or greater |
| Comparative Example 2 | 80 | 19.7 | 21.6 | 7.1 | 121 |
| Comparative Example 3 | 65 | 19.7 | — | — | 127 |
| Comparative Example 4 | 45 | 19.7 | 21.6 | 7.1 | 92 |
| Comparative Example 5 | 50 | 13.3 | 20.8 | 12.4 | 95 |
| Comparative Example 6 | 80 | 15.8 | 17.2 | 2.9 | 111 |
| Comparative Example 7 | 80 | 19.7 | 17.2 | 9.1 | 108 |

INDUSTRIAL APPLICABILITY

The forming material and the paint composition are not merely capable of being suitably used to provide anti-fingerprint property, but are also capable of being used to give substantially the same function to surfaces of various plastic formed articles, lenses of outermost surface portions of cameras, lenses of glasses, window glasses of architectural structures, vehicles and various printing materials as well as various printed matters.

The invention claimed is:

1. A forming material having at least a layer on at least one of surfaces of a support substrate material, wherein
    the layer has a 60-degree specular gloss level prescribed in JIS Z8741 (1997 edition) greater than or equal to 60%, and
    the layer has a surface property that $\Delta E^*_{ab}$(di: 8°)Sb10W10 and $\Delta E^*_{ab}$(de: 8°)Sb10W10 prescribed in JIS Z8730 (2009 edition) and JIS Z8722 (2009 edition) before and after a mock fingerprint is deposited are less than or equal to 0.4 and less than or equal to 4, wherein the mock fingerprint is obtained when a dispersion made up of 70 mass % of oleic acid and 30 mass % of silica whose number average particle diameter is 2 μm is deposited to 1.0 g/m² on a silicone rubber whose Ra according to JIS B0601 (2001 edition) is 3 μm and whose rubber hardness according to JIS K6253 (1997 edition) is 50, and wherein the mock fingerprint is deposited on an object surface at 30 KPa, and
    wherein the number of peaks exceeding a root-mean-square roughness of the layer observed under an atomic force microscope (AFM) is greater than or equal to 800 and less than or equal to 1500 per 25 μm².

2. The forming material according to claim 1, wherein the amount of deposition of the mock fingerprint onto the layer surface is less than or equal to 0.1 g/m².

3. The forming material according to claim 1, wherein the median diameter of oil droplets constituting the mock fingerprint on the layer surface calculated based on an area reference frequency distribution is less than or equal to 80 μm.

* * * * *